(12) United States Patent
Silva et al.

(10) Patent No.: US 11,188,099 B2
(45) Date of Patent: Nov. 30, 2021

(54) METHOD, SYSTEM AND APPARATUS FOR AN AUTONOMOUS ROUTING ALGORITHM WITH A FAILSAFE PROVISION AT A FINAL DROP-OFF LOCATION

(71) Applicant: GM GLOBAL TECHNOLOGY OPERATIONS LLC, Detroit, MI (US)

(72) Inventors: Joao H. Silva, Grosse Pointe Farms, MI (US); Anthony G. Lobaza, Bloomfield Hills, MI (US); Satish Sharma, Matawan, NJ (US); Sakthi Narayanan Govindarajan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 16/394,117

(22) Filed: Apr. 25, 2019

(65) Prior Publication Data

US 2020/0341490 A1 Oct. 29, 2020

(51) Int. Cl.
| | |
|---|---|
| *G05D 1/02* | (2020.01) |
| *G05D 1/00* | (2006.01) |
| *H04W 88/16* | (2009.01) |
| *H04W 24/02* | (2009.01) |
| *G01C 21/34* | (2006.01) |
| *H04W 4/40* | (2018.01) |

(52) U.S. Cl.
CPC ....... *G05D 1/0297* (2013.01); *G01C 21/3453* (2013.01); *G05D 1/0022* (2013.01); *G05D 1/0027* (2013.01); *H04W 4/40* (2018.02); *H04W 24/02* (2013.01); *H04W 88/16* (2013.01); *G05D 2201/0213* (2013.01)

(58) Field of Classification Search
CPC .. G05D 1/0297; G05D 1/0022; G05D 1/0027; G05D 2201/0213; H04W 88/16; H04W 24/02; H04W 4/40; H04W 4/024; H04W 4/44; H04W 4/029; H04W 88/18; H04W 24/10; G01C 21/3453; B60W 60/001; B60W 60/00256
See application file for complete search history.

(56) References Cited

U.S. PATENT DOCUMENTS

2020/0314614 A1* 10/2020 Moustafa ................ H04L 63/08

* cited by examiner

*Primary Examiner* — Rodney A Butler
(74) *Attorney, Agent, or Firm* — Lorenz & Kopf LLP

(57) ABSTRACT

Systems and methods are provided for preventing a loss of throughput data connectivity from one or more active autonomous vehicles of the fleet communicating with a back office network by: collecting an average aggregate of the throughput data from the one or more active AVs communicating with the back office network; updating a set of records in a throughput data table corresponding to a plurality of mapped AV routes for the one or more active AVs, by processing a throughput data table record in the temporary buffer of updated throughput data to eliminate identified duplicate or out-of-date throughput data recorded in the throughput data table; and determining, by the back office network, whether one or more of the AV route segments or the final drop-off location exhibits the effect of an instance of the loss of throughput data connectivity between the AV and the back office network.

20 Claims, 16 Drawing Sheets

METHOD, SYSTEM AND APPARATUS FOR AN AUTONOMOUS ROUTING ALGORITHM WITH A FAILSAFE PROVISION AT A FINAL DROP-OFF LOCATION

INTRODUCTION

The present disclosure generally relates to autonomous vehicles, and more particularly relates to methods, systems and apparatuses for an autonomous routing algorithm with a failsafe provision that is intended to manage the final drop off locations and the routing when either a wireless (i.e. cellular) signal reception is not available or there is insufficient throughput for the autonomous vehicle (AV) in order to prevent an AV from being stranded due to a loss of data throughput connectivity.

With the advent of autonomous vehicles, there is likely to emerge a host of options for individuals requiring mobility other than the buying and use of a privately owned vehicle. For example, it is foreseeable that large fleets of autonomous vehicle are located and made available in towns and cities for picking up and dropping of individuals as desired. Instead of being relegated to using a taxi, public transportation, or a privately-owned vehicle to get around, an individual in certain locales may simply on-demand call an autonomous vehicle for a pickup and drop off at a desired location.

However, such on-demand autonomous fleet vehicles require a constant or nearly constant level of wireless connectivity not only for scheduling but for notifying back office centers of the vehicle operations at least for safety and efficacy of this type of on-demand transportation system. Hence, there is a need for maintaining connectivity's with the autonomous vehicle and the back office (i.e. vehicle-to-cloud (V2C) communication) at a sufficient level to enable drop offs, pickups and route selections that are monitored and can be performed even when intermittent or losses of connectivity occur in the vehicle operation.

There is a need for real-time communications with the autonomous vehicle and the back office infrastructure to provide the vehicle with updated data in an in-vehicle database for predictive global path planning and for preventing vehicles from being stranded at locations without connectivity. This is because the autonomous vehicle needs to "know" much more about its immediate environment and the route ahead to avoid or lessen instances of failures in operation that can result when connectivity is limited or non-existent on routes proceeded, or at drop off and pickup locations.

Accordingly, it is desirable to provide systems and methods that are capable of providing advance control commands for controlling an autonomous vehicle when connectivity between the autonomous vehicle and a cloud infrastructure are lost. Moreover, it is desirable to provide learning systems and methods that take advantage of prior knowledge of locations of connectivity, that take advantage of past information that has been learned about mapping routes and locations with connectivity available, and that are capable of learning more complex driving behaviors for navigating the autonomous vehicle after drop-offs that have no connectivity which are reliable, easy to implement, and easy to validate.

Furthermore, other desirable features and characteristics of the present disclosure will become apparent from the subsequent detailed description and the appended claims, taken in conjunction with the accompanying drawings and the foregoing technical field and background.

The background description provided herein is for the purpose of generally presenting the context of the disclosure. Work of the presently named inventors, to the extent it is described in this background section, as well as aspects of the description that may not otherwise qualify as prior art at the time of filing, such as drawbacks or prior approaches, are neither expressly nor impliedly admitted as prior art against the present disclosure.

SUMMARY

Methods, systems and apparatuses for an autonomous routing algorithm with a failsafe provision for managing final drop off locations and routing when there is either a loss of cellular signal reception or it is not available or not sufficient throughput during operation of the autonomous vehicle (AV) which can result in AV being stranded due to the loss of data throughput connectivity.

In an exemplary first embodiment, a method for preventing at least one autonomous vehicle (AV) of a fleet of AVs in operation from a loss of throughput data connectivity based on the processing of real-time aggregated throughput data received from one or more active AVs of the fleet communicating with a back office network wherein the back office network sends routing data to each available AV in the fleet is provided. The method includes: collecting, by the back office network, an average aggregate of the throughput data from the one or more active AVs communicating with the back office network for storing in a temporary buffer at the back office network; asynchronously updating, by the back office network, a set of records in a throughput data table corresponding to a plurality of mapped AV routes for the one or more active AVs, by processing a throughput data table record in the temporary buffer of updated throughput data to eliminate identified duplicate or out-of-date throughput data recorded in the throughput data table; compiling, by the back office network, the throughput data of each record in the throughput data table by assessing one or more mapped AV route segments to a plurality of throughput data thresholds; determining, by the back office network, at least one mapped AV route segment having an effect by the compiled change in an AV reservation including a set of mapped AV route segments from a pick-up location to a final drop-off location; determining, by the back office network, whether one or more of the AV route segments or the final drop-off location exhibits the effect of an instance of the loss of throughput data connectivity between the AV and the back office network; and re-configuring, by the back office network, at least the one or more of the AV route segments or the final drop-off location of the set of mapped AV route segments with the loss of throughput data to attempt to or to prevent the instance of the loss of throughput data connectivity between the AV and the back office network while traversing the AV route segments or at the final drop-off location.

In various exemplary embodiments, the method, further includes: categorizing, by the back office network, the one or more mapped AV route segments corresponding to a particular throughput data threshold by color for viewing available mapped AV route segments on a multi-dimensional map. The color correspond to the throughput data threshold including: a red color for the throughput data threshold less than 5 Kbps, a yellow color for the throughput data threshold less than 600 Kbps, and a green color for the throughput data threshold greater than or equal to 600 Kbps.

The method further includes: receiving, by the back office network, a set of updated data of position, time and an average aggregate of the throughput data from the one or more connected AVs in communication with the back office processor to re-configure the one or more AV route segments for the AV to proceed from the pickup location to the drop-off location wherein the reconfigured set of AV route segments attempts to maintain a higher level of throughput data connectivity.

The method further includes: receiving, by the back office network, a request by the AV to assess the set of mapped AV route segments and final drop-off location for each new AV reservation where the AV is proceeding from the pickup location to the final drop-off location. The method, further includes: instructing in advance of the AV proceeding to the final drop-off location, by a global path planner deployed with the back office network, if at the final drop-off location there is deemed a loss of throughput data connectivity to proceed to an alternative safe final location after having proceeded to the final drop-off location for a drop-off wherein at the alternative safe final location, the AV is able to maintain without loss the throughput data connectivity with the back office network.

The method further includes: adding an additional mapped route segment, by the global path planner, for a route of the AV to enable the AV to proceed to the alternative safe final location. The method further includes: uploading, by the global path planner, the additional mapped route segment, to enable the AV to proceed to the alternative safe final location. The method further includes: determining in advance, by the global path planner, of the AV proceeding to the final drop-off location, options of safe alternative final drop-off locations; and presenting, by the global path planner, the safe alternative final drop-off locations to enable a choice of the safe alternative final drop-off location to maintain without loss the throughput data connectivity of the AV with the back office network.

The method further includes: continuously monitoring, by the back office network, the mapped AV route segments for compiled changes resulting in instances of loss of throughput data connectivity on mapped AV routes for the one or more active AVs.

In second exemplary embodiment, a system for preventing a networked cloud connected autonomous vehicle (AV) from losing connectivity with a back office network is provided. The system includes: a back office network collecting an average aggregate of throughput data from one or more active AVs communicating with the back office network for storing in a temporary buffer at the back office network; the back office network updating a set of records in a throughput data table corresponding to a plurality of mapped AV routes for the one or more active AVs, by processing a throughput data table record in a temporary buffer of updated throughput data to eliminate identified duplicate or out-of-date throughput data recorded in the throughput data table; the back office network compiling the throughput data of each record in the throughput data table by assessing one or more mapped AV route segments to a plurality of throughput data thresholds; the back office network determining at least one mapped AV route segment having an effect by a compiled change in an AV reservation including a set of mapped AV route segments from a pick-up location to a final drop-off location; the back office network determining whether one or more of the AV route segments or the final drop-off location exhibits the effect of an instance of the loss of throughput data connectivity between the AV and the back office network; and the back office network re-configuring at least the one or more of the AV route segments or the final drop-off location of the set of mapped AV route segments with the loss of throughput data to attempt to or to prevent the instance of the loss of throughput data connectivity between the AV and the back office network while traversing the AV route segments or at the final drop-off location.

The system further includes: the back office network categorizing the one or more mapped AV route segments corresponding to a throughput data threshold by color for viewing available mapped AV route segments on a multi-dimensional map. The color correspond to the throughput data threshold including: a red color for the throughput data threshold approximately equal to 0 Kbps, a yellow color for the throughput data threshold less than 600 Kbps, and a green color for the throughput data threshold greater than or equal to 600 Kbps.

The system further includes: the back office network receiving a set of updated data of position, time and an average aggregate of the throughput data from the one or more connected AVs in communication with the back office network to re-configure the one or more AV route segments for the AV to proceed from the pickup location to the drop-off location wherein the re-configured set of AV route segments attempts to maintain a higher level of throughput data connectivity.

The system further includes: the back office network receiving a request by the AV to assess the set of mapped AV route segments and final drop-off location for each received AV reservation where the AV is proceeding from the pickup location to the final drop-off location.

The system further includes: a global path planner coupled with the back office network to instruct in advance of the AV proceeding to the final drop-off location, if at the final drop-off location there is deemed a loss of throughput data connectivity to proceed to an alternative safe final location after having proceeded to the final drop-off location for a drop-off wherein at the alternative safe final location, the AV is able to maintain without loss the throughput data connectivity with the back office network.

The system further includes: the global path planner determining in advance, of the AV proceeding to the final drop-off location, options of safe alternative final drop-off locations, and presenting the safe alternative final drop-off locations to enable a choice of the safe alternative final drop-off location to maintain without loss the throughput data connectivity of the AV with the back office network.

In a third exemplary embodiment, an in-vehicle apparatus for real-time cellular data throughput data collection to prevent a loss of connectivity of an autonomous vehicle (AV) with a back office network is provided. The in-vehicle apparatus includes: a processor deployed in the AV programmed with a set of instructions to execute an algorithm to instruct the processor to collect cellular throughput data from one or more active network devices (NADs) deployed in the AV; the processor configured to monitor and to collect cellular throughput data sent from the NADs to an AV fleet operations interface at the back office network; the processor, instructed by the algorithm, to collect cellular throughput data from each active NAD in a particular time period; the processor, instructed by the algorithm, to compute aggregate throughput data by adding individual throughput data from each active NAD; and the processor, instructed by the algorithm, to send a computed aggregate throughput data to the AV fleet operations interface for processing by the back office network.

In various exemplary embodiments, the in-vehicle apparatus, further includes: the processor of the AV receiving route options for better throughput data connectivity in an attempt to prevent a loss of throughput data connectivity when proceeding from a pickup to a final drop-off location wherein the route options are based in part on the computed aggregate throughput data sent to the AV fleet operations interface processed by the back office network.

The in-vehicle apparatus further includes: the processor receiving instructing in advance of the AV proceeding to the final drop-off location, via the AV fleet operations interface, if at the final drop-off location there is determined to be a loss of throughput data connectivity and instructed to either proceed to an alternative safe final location after having gone to the final drop-off location for a drop-off or presented with a safe alternative final drop-off location.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
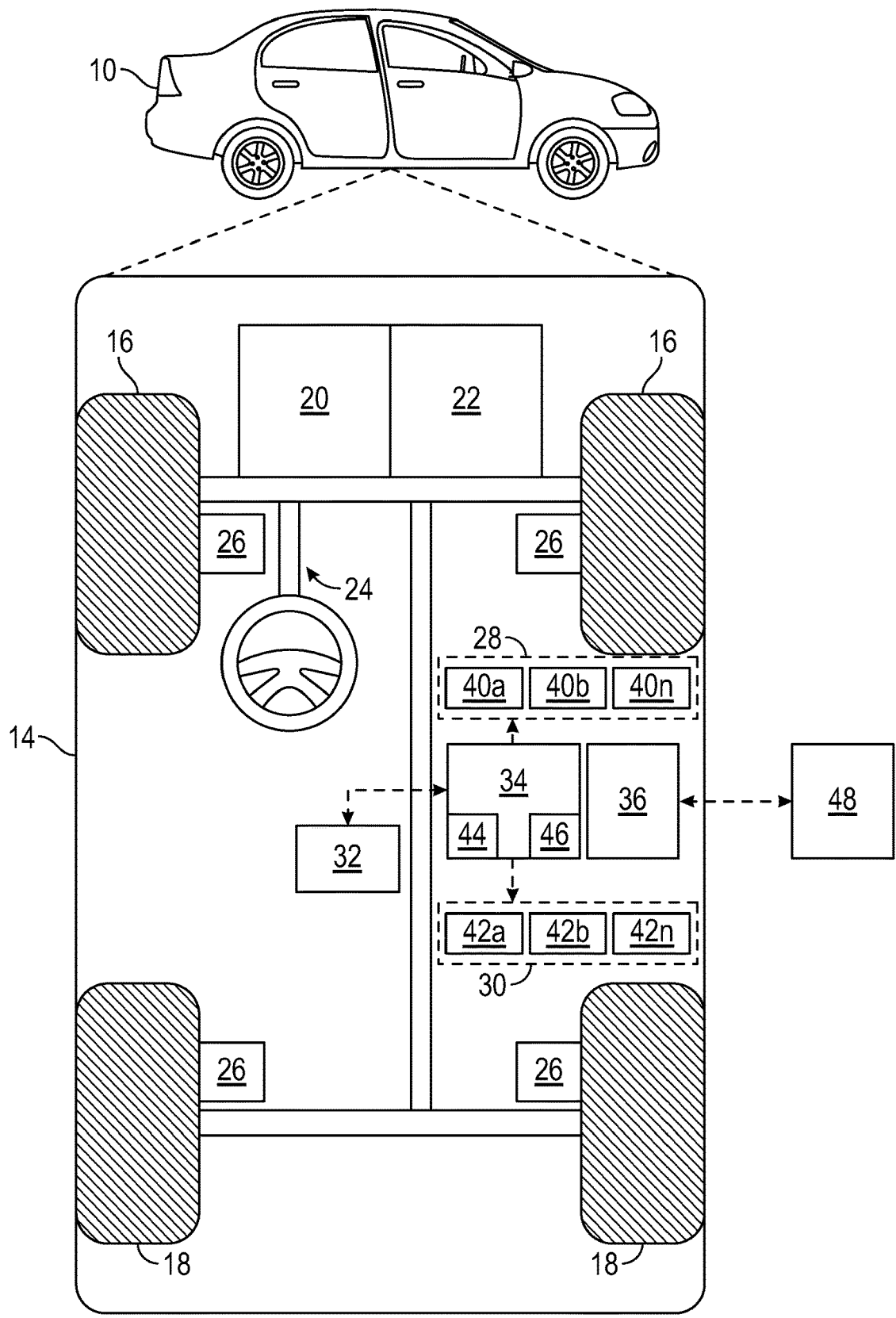
FIG. 1 is a functional block diagram illustrating an autonomous vehicle in accordance with the disclosed embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The implementation of the vehicle-to-Infrastructure (V2I) like a back office is the next generation of Intelligent Transportation Systems (ITS). V2I applications capture an aggregated a host of vehicle-generated traffic data that can result in wirelessly providing information such as advisories from the infrastructure (i.e. back office) to the vehicle that provide control options for the vehicle to enhance mobility or recognize the impact of environment-related conditions. In addition, with the emergence of connected infotainment systems (connected navigation, social media, music streaming, and in-car Wi-Fi) and accompanying automotive application frameworks, more advanced vehicle connectivity and cloud capabilities are required during AV operations. Further, with the advent of advanced cloud-based connected car platforms with capabilities that far exceed those of legacy telematics platforms, these advanced platforms require sufficient levels of broadband cellular connectivity not always present for 3G, but now increasingly 4G, and 5G based services.

The AVs require high bandwidth for operations to collect real-time data for assessment (to include collaboration with the Real-Time Data Capture and Management programs) and to assess data from historical and real-time traffic and travel behavior perspectives for dynamic and proactive decision making in vehicle operations.

In various exemplary embodiments, the present disclosure uses terms such as follows: the cellular data throughput as the amount of data moved successfully from one place to another within a given time. The final drop-off location as where the last ride hailing customer and/or passenger(s) needs to be dropped off at the end of their ride. This is because, after the ride terminates the autonomous vehicle must either park on a safe location, move to a service hub or continue to next ride reservation assignment. The red segment (referred in various exemplary diagrams) as areas reported by autonomous vehicles, where the aggregated cellular data throughput is 0 kbps for approximately 'n' measurements. The route segment which is a section of a geo-fenced AV route identified by a beginning and an ending location coordinate. The yellow segment areas as reported areas by autonomous vehicles where the aggregated cellular data throughput is less than 600 kbps but greater than 0 kbps for approximately 'n' measurements. The green segment areas which are reported by autonomous vehicles where the aggregated cellular data throughput is greater than 600 kbps for approximately 'n' measurements. The final path which is the calculated path for the autonomous vehicle to navigate from one location to the other assigned location. The alternate safe location which is a safe parking location in a green segment, where an autonomous vehicle can communicate with back office. The final path with alternate safe location which is a final path with additional paths from the final drop-off location to a nearby alternate safe location, provided to the autonomous vehicle by the back office. The last known location is the last reported vehicle location by the autonomous vehicle that is recorded in the back office. The above descriptions of uses of the terms should not be considered limiting but a guide to usage and understanding of the present disclosure that may include other ordinary and usage meanings as warranted in the present disclosure.

In various exemplary embodiments, the present disclosure describes systems and method that provide benefits to an overall AV program by enabling optimization of the usage of AVs in the fleet by the reducing of the number of AVs that are found to be stranded and prevented from operation at the final drop off location. Further optimizations are enabled by significantly reducing the number of AVs stranded due to lack of required connectivity. In addition, the optimizing of the AV Fleet Operation will result in other tangential benefits such as improvement in the efficiency of AV deployments as follows: by avoiding affected routes and by increasing the usage in better connectivity routes, by reducing the traffic congestion at the final drop-off location and having prior knowledge of connectivity quality at the final drop-off location in advance, by giving the flexibility to negotiate alternative drop-off locations with the ride hailing passenger(s) which can result in reducing routing of AVs to problematic destinations and on routes lacking connectivity. Also, an overall better customer experience is provided by a predictive nature of the algorithm that helps alert the ride hailing passenger(s) in advance about the potential connectivity problems and provides alternate choices to provide enhanced connectivity that would ordinary not of resulted in the prescribed route.

The vehicle automation is categorized into numerical levels ranging from Zero, corresponding to no automation with full human control, to five, corresponding to full automation with no human control. In various automated driver-assistance systems, such as cruise control, adaptive cruise control, and parking assistance systems correspond to lower automation levels, while true "driverless" vehicles correspond to higher automation levels. Currently, there are many different approaches for autonomous vehicle control with the higher levels of automation however, in general the approaches require significant levels of cellular or wireless connectivity's between the AV and the back office infrastructure and route planning based on bandwidth and connectivity levels available in advance will enhance objectives to meet this requirement.

FIG. 1 is a functional block diagram illustrating an autonomous vehicle in accordance with the disclosed embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and an autonomous driving system (ADS) is incorporated into the autonomous vehicle 10 (hereinafter referred to as the autonomous vehicle 10) that intelligently controls the vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 can be, for example, a Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, at least one data storage device 32, at least one controller 34, a communication system 36, and an actuator system 90. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, optical cameras, thermal cameras, imager sensors, ultrasonic sensors, inertial measurement units, global positioning systems, navigation systems, and/or other sensors.

For example, radar devices can process electromagnetic waves reflected from objects to generate radar data that indicates the presence, direction, distance, and speed of objects within the field of view. A radar filtering and pre-processing module can pre-process the radar data to remove things like stationary objects, objects in undriveable areas (like radar returns from buildings) and noisy measurements/interference (e.g., due to velocity) to generate pre-processed radar data. Radar tracking can then further process the pre-processed radar data to generate the radar tracking information, which can then be used to track objects.

Cameras (or image sensors) can be spaced to provide three-hundred and sixty (360) degree image coverage of the environment surrounding the vehicle 10. The cameras capture images (e.g., image frames) and output image data (e.g., a distorted, YUV format image), which can then be processed to generate rectified (or undistorted) camera images. Each of the lidar devices receive lidar data and process the lidar data (e.g., packets of lidar return information) to generate a lidar point cloud (e.g., a three-dimensional set of points in a three-hundred and sixty (360) degree zone around the vehicle).

The actuator system 90 includes one or more actuator devices 42a-42n that control one or more vehicle features such as, but not limited to, the propulsion system 20, the transmission system 22, a throttle system (not illustrated), the steering system 24, and the brake system 26. As will be explained below, control signals from a vehicle control module are processed to generate commands that control one or more of these actuator devices 42a-42n in accordance with the control signals 172 to schedule and execute one or more control actions to be performed to automatically control the autonomous vehicle and automate the autonomous driving task encountered in the particular driving scenario (e.g., to achieve one or more particular vehicle trajectory and speed profiles). In addition, in some embodiments, the vehicle features can further include interior and/or exterior vehicle features such as, but are not limited to, doors, a trunk, and cabin features such as air, music, lighting, etc. (not numbered).

Figure 2:
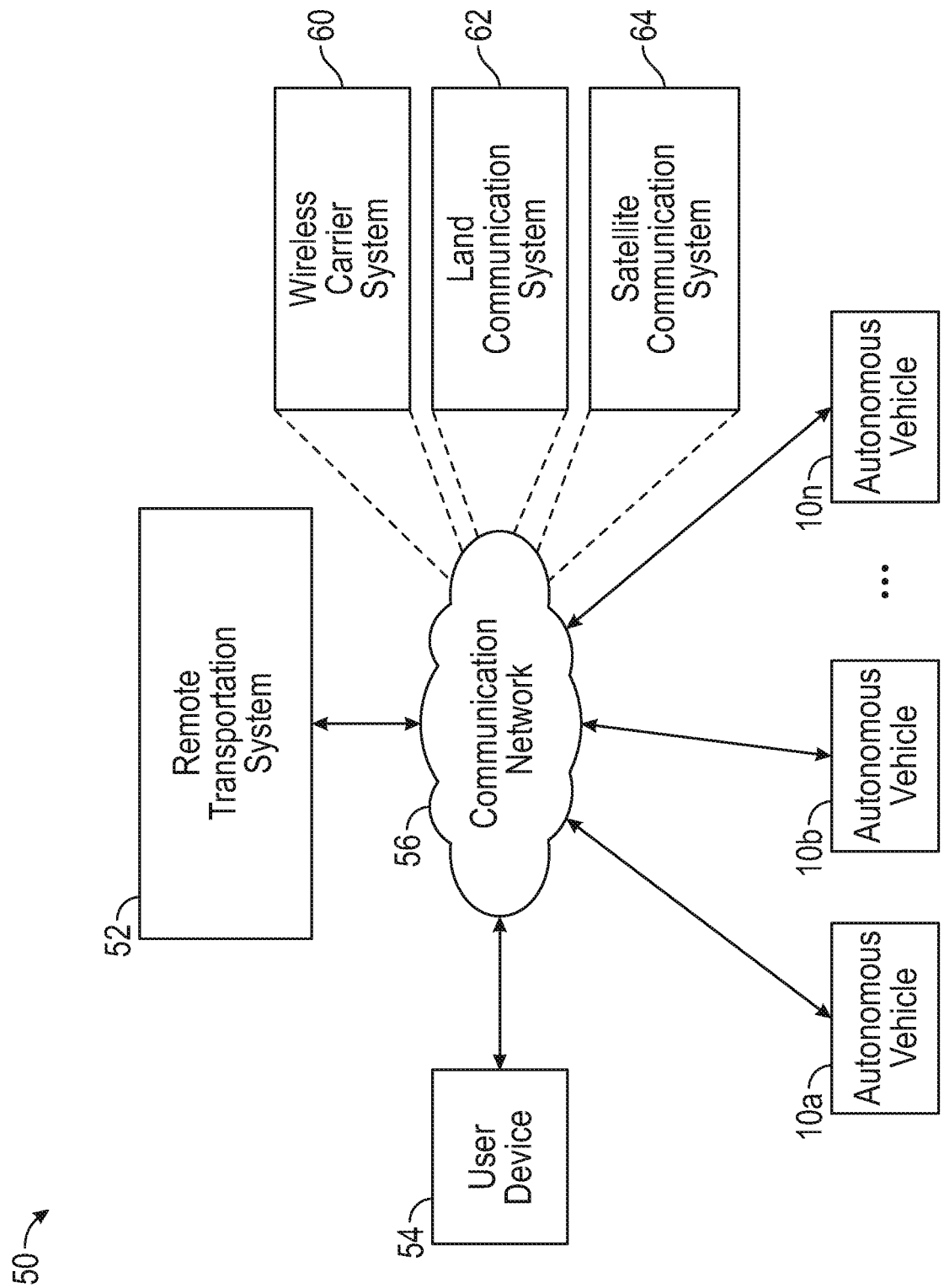
FIG. 2 is a functional block diagram illustrating a transportation system having one or more autonomous vehicles of FIG. 1 in accordance with the disclosed embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (i.e. the back office and described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 90 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more actuator devices 42a-42n that control one or more vehicle features of the autonomous vehicle 10.

In various embodiments, one or more instructions of the controller 34 are embodied in a high-level controller of an autonomous driving system (ADS) and, when executed by the processor 44 generate a vehicle trajectory and speed profile that can be processed to generate the control signals that are processed to generate commands that control one or more of actuators of the autonomous vehicle to execute one or more control actions to automatically control the autonomous vehicle (e.g., to automate the autonomous driving task encountered in the particular driving scenario).

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based back office network. FIG. 2 illustrates an exemplary embodiment of an operating environment shown generally at 50 that includes an autonomous vehicle based back office network 52 that is associated with one or more autonomous vehicles 10a-10n as described with regard to FIG. 1. In various embodiments, the operating environment 50 further includes one or more user devices 54 that communicate with the autonomous vehicle 10 and/or the back office network 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the back office network 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the back office network 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The back office network 52 includes one or more back office server systems, which may be cloud-based, network-based, or resident at the particular campus or geographical location serviced by the back office network 52. The back office network 52 can be manned by a live advisor, or an automated advisor, or a combination of both. The back office network 52 can communicate with the user devices 54 and the autonomous vehicles 10a-10n to schedule rides, dispatch autonomous vehicles 10a-10n, and the like. In various embodiments, the back office network 52 stores account information such as subscriber authentication information, vehicle identifiers, profile records, behavioral patterns, and other pertinent subscriber information.

In accordance with a typical use case workflow, a registered user of the back office network 52 can create a ride request via the user device 54. The ride request will typically indicate the passenger's desired pickup location (or current GPS location), the desired destination location (which may identify a predefined vehicle stop and/or a user-specified passenger destination), and a pickup time. The back office network 52 receives the ride request, processes the request, and dispatches a selected one of the autonomous vehicles 10a-10n (when and if one is available) to pick up the passenger at the designated pickup location and at the appropriate time. The back office network 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based back office network 52. To this end, an autonomous vehicle and autonomous vehicle based back office network can be modified, enhanced, or otherwise supplemented to provide the additional features described in more detail below.

Figure 3:
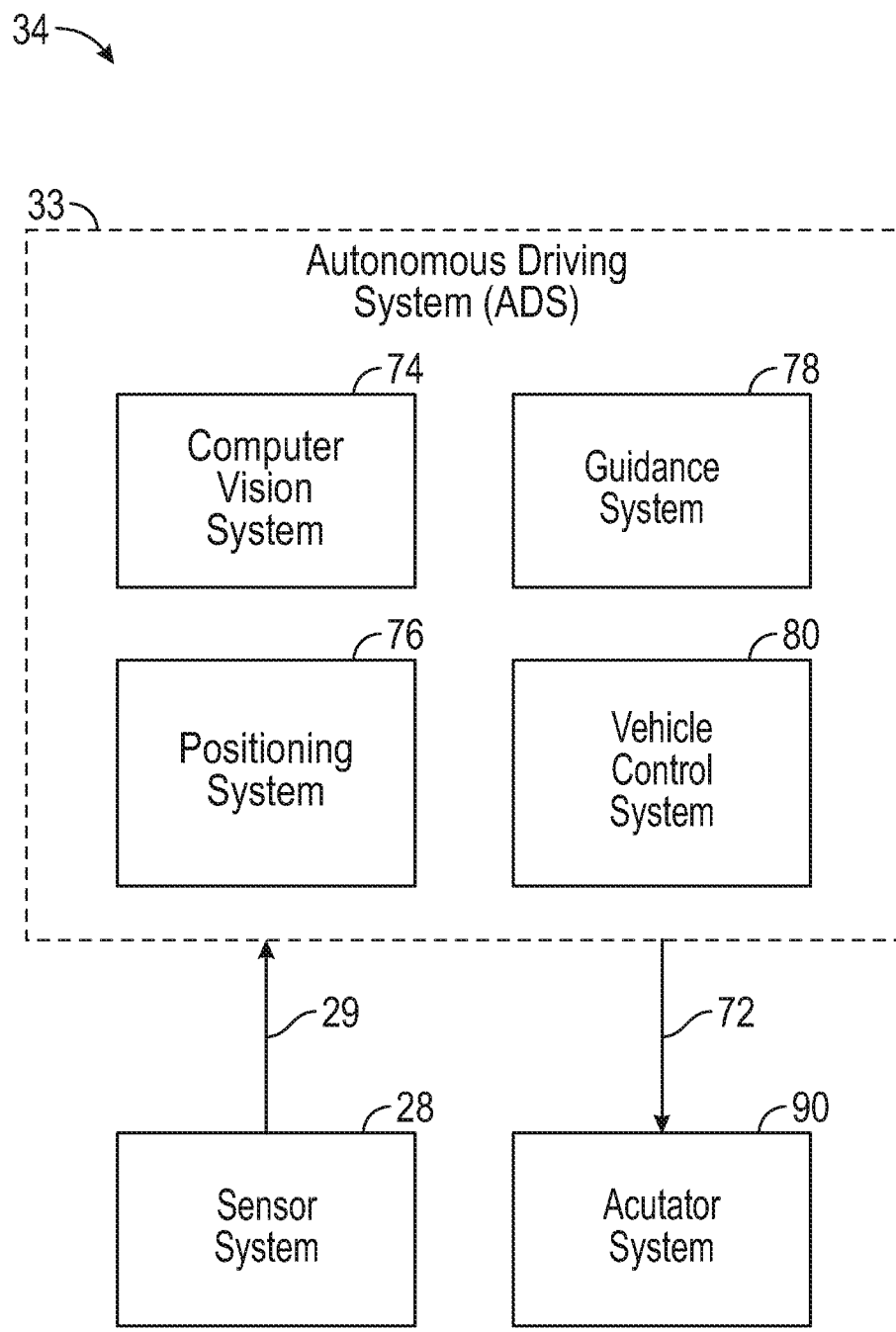
FIG. 3 is a dataflow diagram illustrating an autonomous driving system of the autonomous vehicle in accordance with the disclosed embodiments.

In accordance with various embodiments, the controller 34 implements a high-level controller of an autonomous driving system (ADS) 33 as shown in FIG. 3. That is, suitable software and/or hardware components of the controller 34 (e.g., the processor 44 and the computer-readable storage device 46) are utilized to provide a high-level controller of an autonomous driving system 33 that is used in conjunction with vehicle 10.

In various embodiments, the instructions for the high-level controller of the autonomous driving system 33 may be organized by function, module, or system. For example, as shown in FIG. 3, the high-level controller of the autonomous driving system 33 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals 72 for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the high-level controller of the ADS 33 is included within the controller 34 of FIG. 1 and can be used to implement portions of a vehicle control system that includes a sensor system, which may correspond to sensor system 28 of FIG. 3 in some embodiments.

As will now be described below with reference to FIGS. 4-14, the disclosed exemplary embodiments can provide the global path planning system and methodology for learning advance routing and driving instructions, and policies based on connectivity levels for self-driving vehicles. The global path planning system maybe described as an end-to-end learning system that uses various back office analysis and storage means (eg. a database tabular structure, a neural network architecture) that leverages auxiliary information related to AV vehicle connectivity for routing planning and instructions after a drop off in advance. For example, the proposed end-to-end learning architecture incorporates path segmentation, vehicle kinematics, and GPS data, while also incorporating transfer learning into the back office applications that can include end-to-end learning architecture. The disclosed embodiments can combine all of these auxiliary tasks and information into one learning back office network that can more efficiently learn control commands and driving policies and update the local in-vehicle databases of each AV. One benefit of training with auxiliary tasks and information (e.g. an event resulting in a higher number of cellular users and low bandwidth availability that is location specific) is faster convergence time and higher accuracy in terms of performance for each AV, while still allowing the global planning system to be trained in advance for the end-to-end driving operations.

Figure 4:
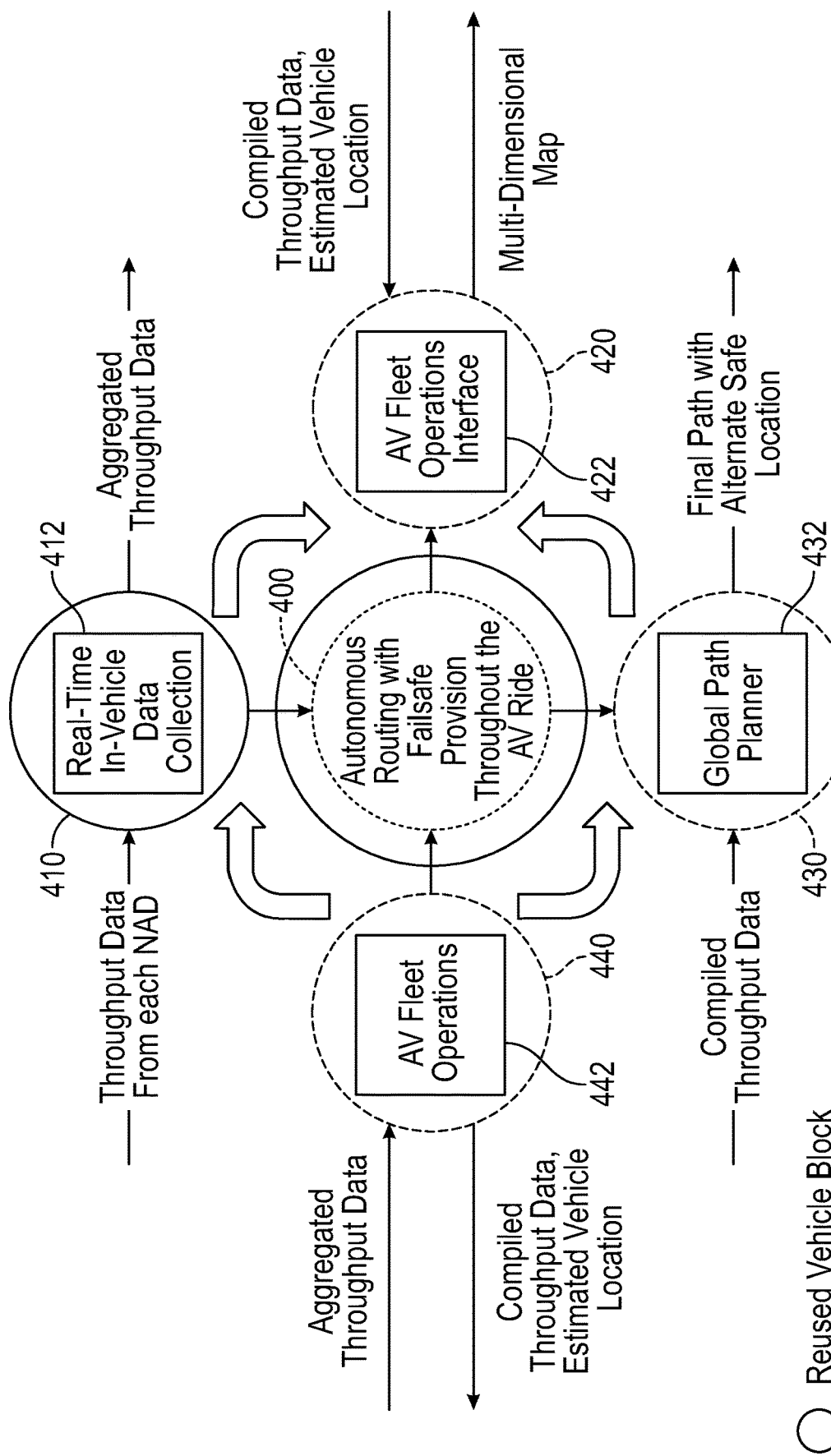
FIG. 4 illustrates an exemplary diagram for vehicle and back office processes of the global path planning system in accordance with an embodiment.

FIG. 4 illustrates an exemplary diagram 400 for vehicle and back office processes of the global path planning system in accordance with an embodiment. In FIG. 4 a configuration of data collection, AV fleet and global path planning modules is shown for automatically routing of the AVs in the best-known throughput paths to avoid loss of AV connectivity with a back office network to provide the following: an enhanced AV experience to the ride hailing customers to the AV fleet, by constantly monitoring the (e.g. cellular) data throughput in the AV's current assigned path; and to provide alternate safe AV paths with a best-known throughput, if available. The usage of real-time AV (e.g. cellular) data throughput improves the autonomous routing algorithm for constant monitoring and re-planning of AV Routes with better throughput paths. The automated process between the AV and the back office network will enable constant monitoring and updating of the AV routes having better throughput data paths, if available, so that the AV can avoid driving to locations with no data throughput available.

The elements described in FIG. 4 include major blocks: a Real-time In-Vehicle throughput data collection module 412, an AV fleet operations module 442, a global path planner 432, and an AV fleet operations interface 422. In the exemplary diagram 400, real-time in-vehicle data is collected at a state 410 from the through-put data from each network access device (NAD) and outputted as aggregated throughput data. At state 420, at an AV fleet operations interface module 422 the compiled throughput data of an estimated vehicle location is received and the multi-dimensional map is outputted. At state 430, the compiled throughput data is received by a global path planner 432 and a final path with an alternate safe location is generated for the AV. At state 440, for the AV fleet operations interface 422, the aggregated throughput data is received and the compiled or processed throughput data of an estimated AV location is generated.

Figure 5:
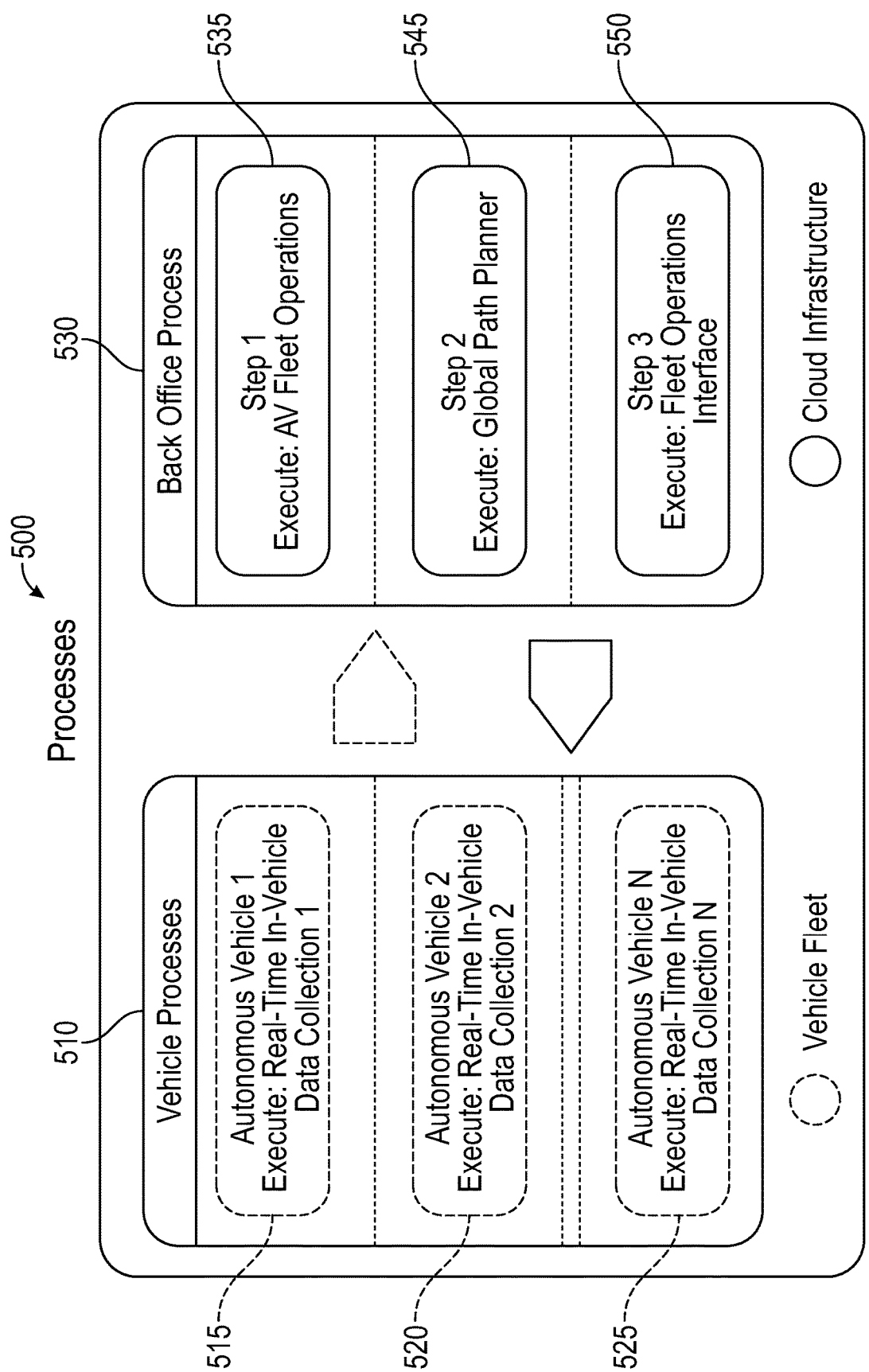
FIG. 5 illustrates an exemplary diagram of the autonomous vehicle and the back office processes of the global path planning system in accordance with an embodiment.

FIG. 5 illustrates an exemplary diagram 500 of the autonomous vehicle and the back office processes of the global path planning system in accordance with an embodiment. In FIG. 5, the vehicle processes 510 formulate the control commands for controlling an autonomous vehicle to address a particular drop off location or route segment with limited or no connectivity. The AV Fleet Operations actively manages all AVs in the fleet. It collects numerous data from the vehicles and sends various commands to the vehicle from back office networks. The AV fleet operations can include applications to collect the aggregated throughput data from the AVs that are actively part of the fleet in order to compile them based on a set of GPS coordinates of an AV route segments. The AV fleet operations is responsible for maintaining the integrity of the aggregated throughput data for every route segment, by compiling and preserving the data in a robust database. In various exemplary embodiments, the database may be configured as a blockchain for data validation and preservation.

As part of compiling the collected data, AV Fleet Operations shall tag the route segments, identified by GPS coordinates, with color labels that denotes the throughput availability for the respective segments. Color labeling shall be categorized as below and can be varied as desired:

Red<than 5 Kbps,
Yellow<600 Kbps, and
Green>=to 600 Kbps.

It should be noted that the above color categorization labeling for particular data throughput ranges is an approximation and can be varied. For example, a "yellow" category could be a data throughput of less than 600 Kbps. The "red" color category could be a data throughput of less than 5 Kbps or an approximate zero or nil throughput value.

The determination by application solutions to declare a route segment with a throughput color category shall or can reside in the AV fleet operations' compilation algorithm, so that the time and distance traveled by the AV in between consecutive readings can also be taken into consideration during the compilation process.

The AV Fleet Operations can provide the compiled data to global path planner for additional route planning at the final drop-off location and to AV Fleet Operations Interface along with additional AV data to plot a multi-dimensional map, overlaying the throughput data on the geo-fenced AV operational area.

For example, a vehicle fleet may include a number of autonomous vehicles: an autonomous vehicle one 515 designated to execute real-time in-vehicle data collection one, the autonomous vehicle two 520 designated to execute real-time in-vehicle data collection two and the autonomous vehicle N 525 designated to execute real-time in-vehicle data collection N. Each AV has a vehicle route planned based on a particular data collection that is stored locally at the vehicle for processing when connectivity is lost. In various embodiments, an end-to-end learning process using local AV processors with a neural network can optionally be implemented. Here, the data collection may be real or actual derived data of the driving environment; for example, bandwidth data is obtained through the sensors measuring the connectivity's in the driving environment. In addition, data augmentation such event and topography data can help increase the size of the bandwidth throughput measurement set of each collection.

The back office network or cloud processes 530 may include at step one, the execution of the fleet operations 535, at step two, the execution of the global path planner 545 and at step three, the execution of the fleet operations interface 550. For example, when the global planner receives notification from the AV fleet operations 535 on a change in compiled throughput data, then at step one all the impacted AV routes are determined. Once the set of AV routes are determined, then the global path planner 545 determines the alternate AV routes with better connectivity, and so on. The fleet operation interface 550 at step three enables collecting and sending, or managing route path planning by data requests back and forth between the back office process 530 and the vehicle process 510 for controlling the AV and for assessing and managing any changes in connectivity's in routes planned for each AV.

Figure 6A:
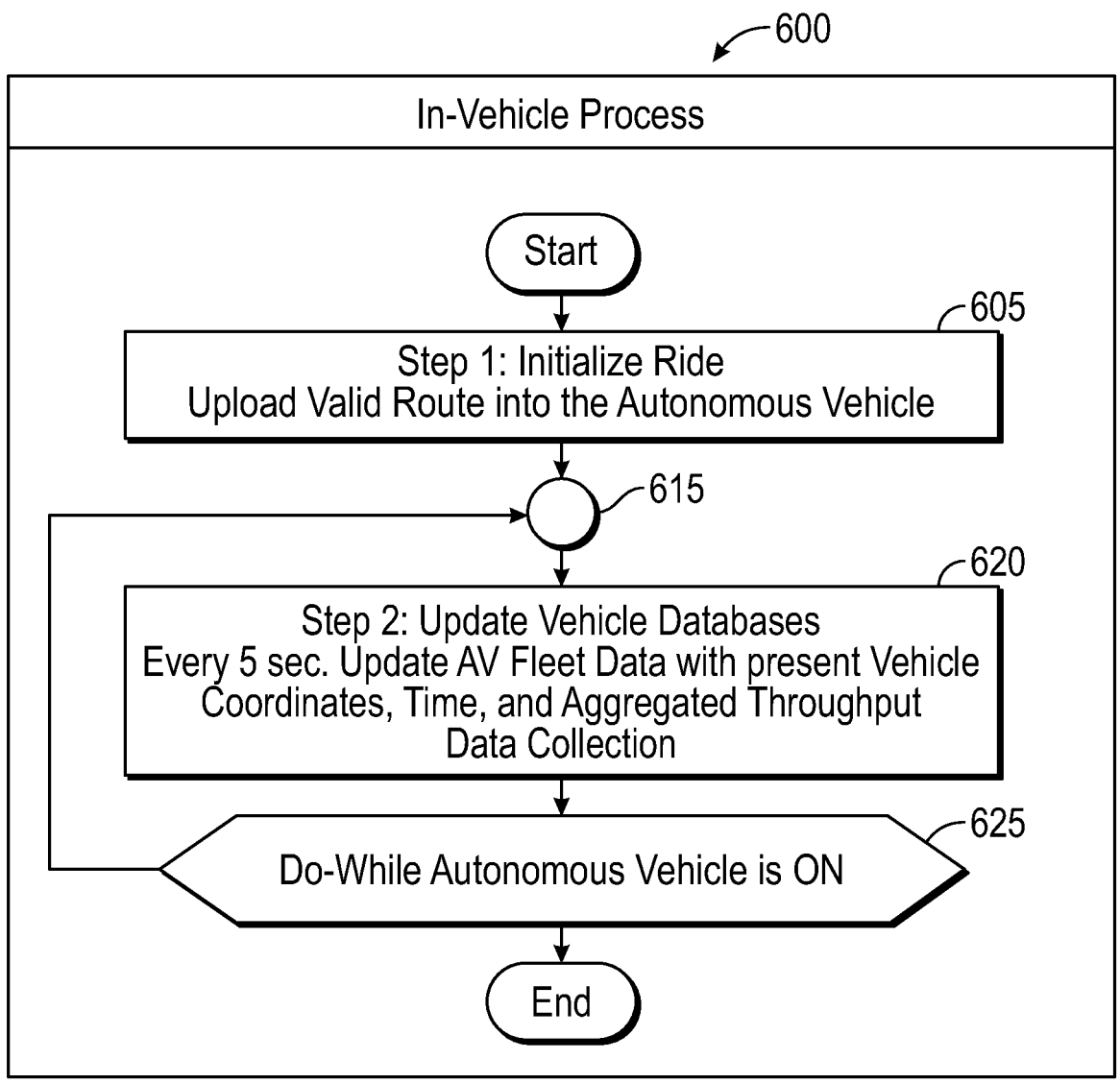
FIGS. 6A and 6B illustrate exemplary flow diagrams of the in-vehicle and the back office processes of the global path planning system in accordance with an embodiment.
Figure 6B:
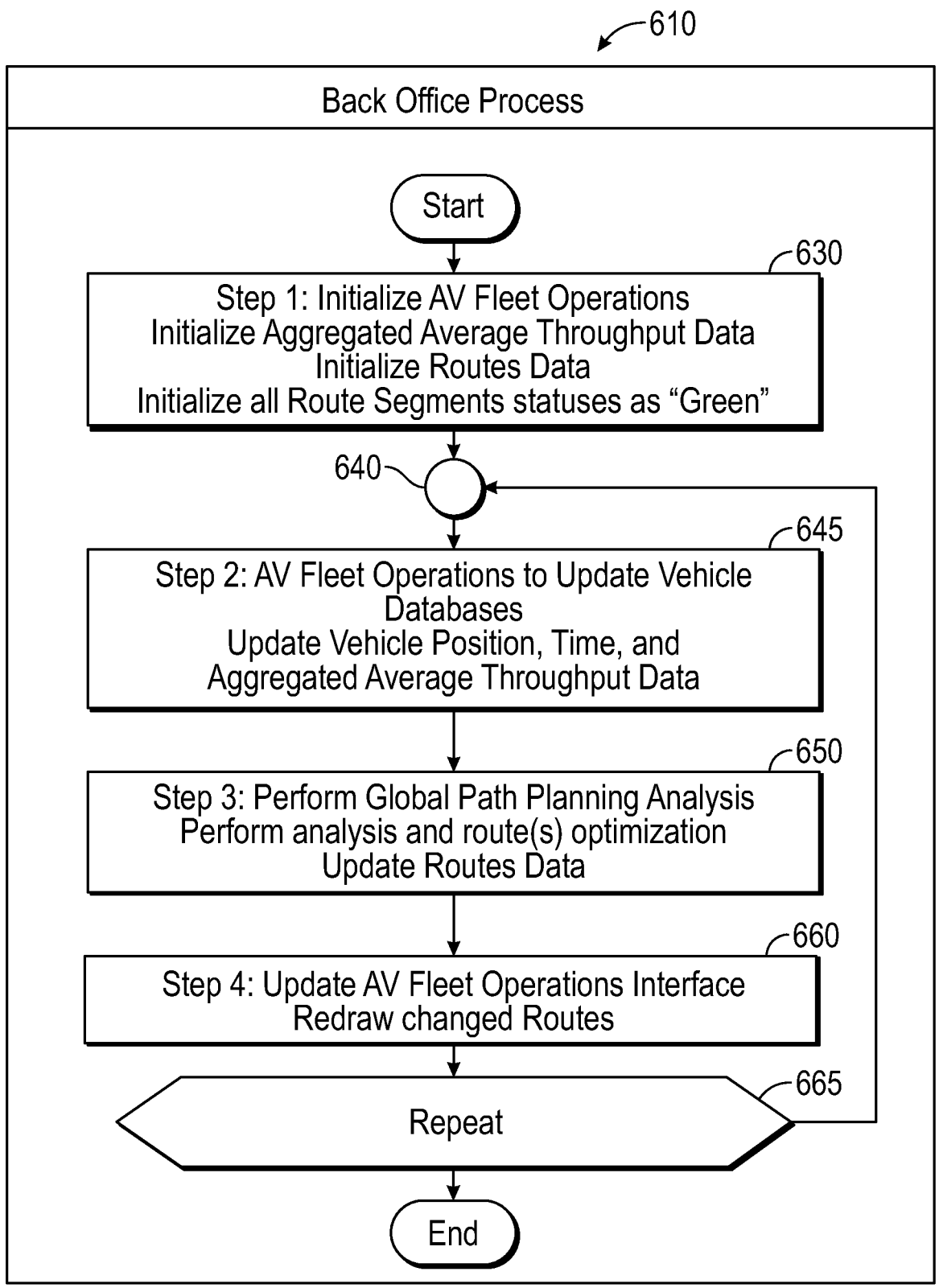

FIGS. 6A and 6B illustrate exemplary flow diagrams of the in-vehicle and the back office processes of the global path planning system in accordance with an embodiment. In FIGS. 6A and 6B, the process flow is illustrated for in-vehicle 600 and back office 610 systems.

In various exemplary embodiments, the algorithmic solutions of the global path planning system operate in parallel to support the aggregate data collections on route segments for the route planning of each AV, the algorithmic solutions that are operating in a symbiotic manner are: the Real-Time In-Vehicle Cellular Data Throughput Collection which is an algorithm that collects Cellular Data Throughput from each configured active NAD in an AV, and then processes and sends the data to AV Fleet Operations in the back office network; the Throughput Data from each NAD, the output by the algorithm of the Aggregated Throughput Data which is performed by Every AV in the Fleet and each AV executes this algorithm continuously when the AV is ON. That is, the process flow every 5 seconds, collects cellular throughput data from each configured active NAD in an AV; the process flow computes the Aggregated Throughput Data by adding all individual throughput data from the NADs; and the process flow sends the computed Aggregated Throughput Data to AV Fleet Operations.

Referring to FIG. 6A, at step 1 (605), the ride is initialized and an upload of the route into the autonomous vehicle is performed so that the valid route is locally stored in memory of autonomous vehicle. This enables the autonomous vehicle to proceed on a particular without a need for continuous connectivity as likely in instances connectivity is not available. Hence, because the valid route is stored locally at the AV, connectivity with the back office network is not needed (though preferred for real-time updates) because there is sufficient information of the route stored locally for the AV to proceed. At step 2 (620) an update of the autonomous vehicle local databases is performed by a back office network update. That is, every 5 seconds an update of the AV Fleet data with available (i.e. presented to back office network) vehicle coordinates, time and aggregated throughput data collection is performed. Hence, at a so called "heartbeat" (i.e. time period for the update) of about every five seconds, the autonomous vehicle sends updated AV fleet data with present vehicle coordinates, time and aggregated throughput data collection to the vehicle database. Next at step 625, this process is performed while the vehicle is ON and is repeat via 615 to repeat the update every 5 seconds until the vehicle is turned OFF.

Referring to FIG. 6B, in the back office process 610, at step 1 (630) an initialize of the AV fleet operations is performed. Here, an initialize aggregated average throughput data is generated which enables an initialize routes data to be generated based on a mapping of the initialize aggregated average throughput data. Next, all the route segments (i.e. pathways from an initial to final location for the EVs) are determine in accordance with a particular status. In this case the status is "green" for available for the AV to proceed in accordance with a particular bandwidth. While the status is designated as "green", the color status can be decided or configured as desired. At step 2 (645) the AV fleet execute operations to update vehicle databases. Here, updated data of the vehicle position, time and aggregated average throughput data is sent to the vehicle databases. This enables, all the AV vehicles to receive the updated information. Next at step 3 (650), a path planning analysis is performed at the back office network (i.e. via processors at servers at the back office network). Here, an analysis and route optimization update of update routes data is performed. Next, at step 4, (660) an update of the routes is determined and the routes are redrawn in accordance with the new data received for more accurate aggregated bandwidths on each segment. At step 665, the process is repeated via a feedback to 640 so long as the AV Fleet is in operation.

Figure 7A:
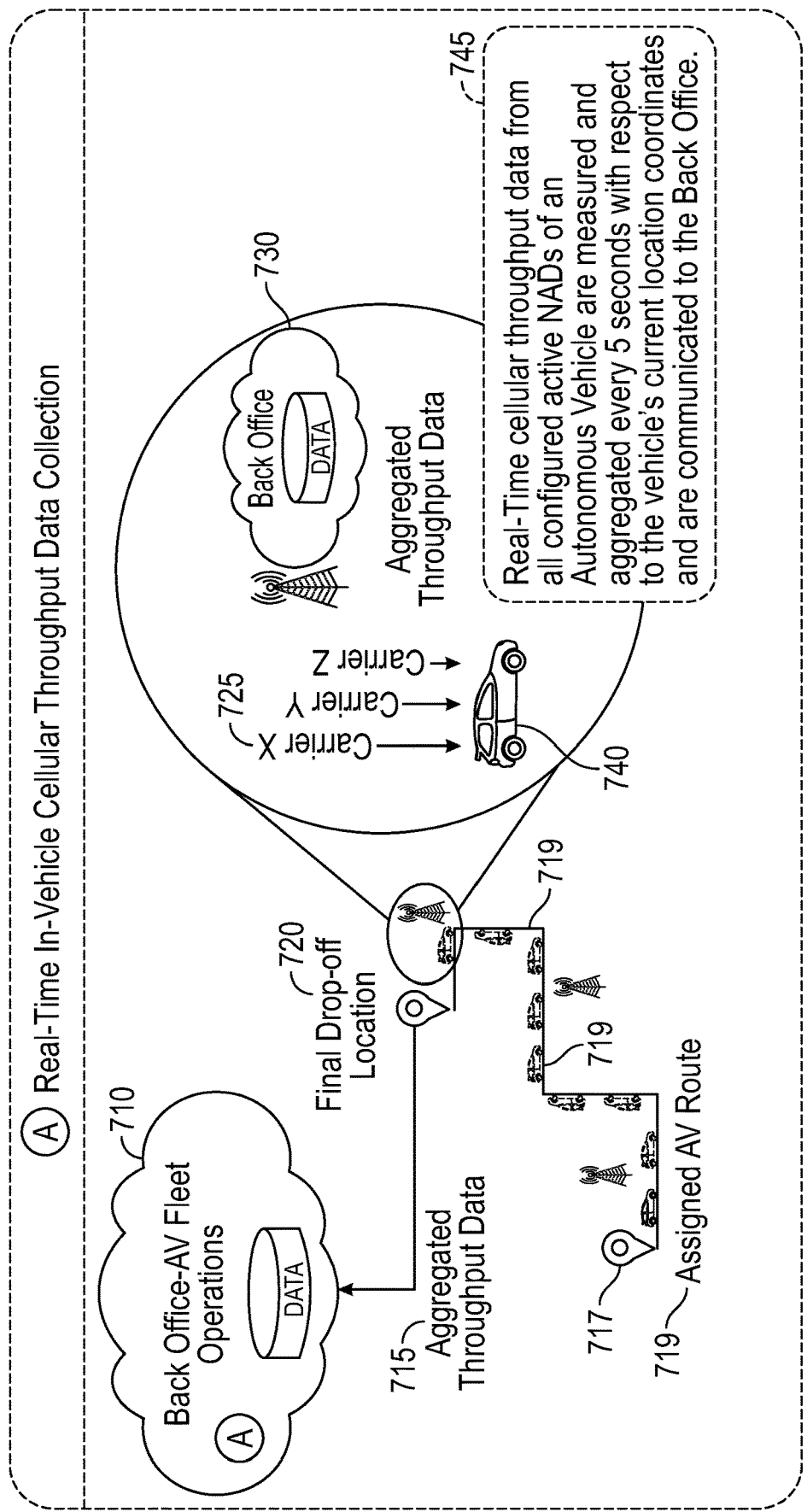
FIGS. 7A and 7B illustrate exemplary diagrams of the real-time in-vehicle cellular throughput data collection of the global path planning system in accordance with an embodiment.
Figure 7B:
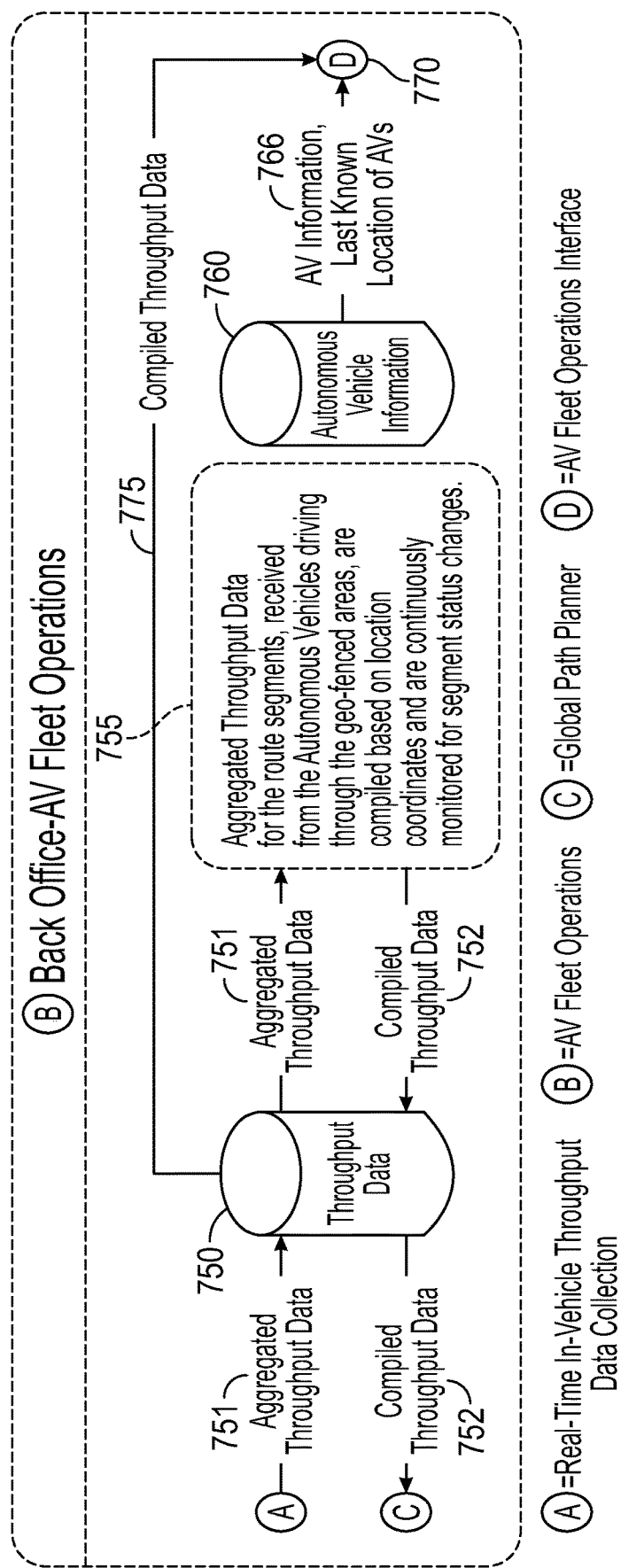

FIGS. 7A and 7B illustrate exemplary diagrams of the real-time in-vehicle cellular throughput data collection of the global path planning system in accordance with an embodiment.

As explained above, the Real-Time Cellular Throughput Data Collection Block. Every AV shall have the capability of continuously capturing the cellular data throughput from each configured active NAD in the vehicle in 5 second increments (i.e. every 5 seconds) for the vehicle's current GPS coordinates and time (See block 745 in FIG. 7A). Additionally, when not in connectivity, the captured throughput data shall still be aggregated and shall be communicated to the back office network (AV Fleet Operations) along with the GPS coordinates and time, when the AV has or regains connectivity.

Referring to FIG. 7A, the requirement for an AV to report the throughput data for a route segment to the back office network shall be turned ON or OFF by AV back office network commands (i.e. illustrated by block of back office operation 710 of FIG. 7A). The aggregated Throughput Data shall be communicated to the back office network.

The back office operation 710 of AV fleet operations (labeled as "(B)" in FIG. 7A) captures a view of network throughput performance by aggregating throughput data 715 of a vehicle from a pickup location 717 via route segments 719 to a final drop off location 720. Each route segment 719 can have a significant impact on performance because of geographic, temporal, latency and signal strength changing properties. That is, the signal performance from the pickup location 717 to the final drop off location 720 is inherently unstable. By collecting an aggregated throughput data set 715 observations can be mapped about signal quality based on region, topology, time of day and long term trends can be determined. The aggregated throughput data can be measured from multiple carrier signals 725 (i.e. carriers x, y, z) for connectivity of an AV 740 to the back office processor 730 for data collection. The real-time cellular throughput data from all configured active NADs of an AV are measured and aggregated every 5 seconds with the to the AV 740 current location coordinates and communicated to the back office 730 processor.

Referring to FIG. 7B, the throughput data 750 is composed of the aggregated throughput data 751 of real-time in-vehicle cellular throughput data collection (labeled as "(A)" in FIG. 7B) and the compiled throughput data 752 is generated for use by the global path planner (labeled as "(C)" in FIG. 7B). The aggregated throughput data 775 for the route segments are received from the autonomous vehicles driving through the geo-fenced areas, are compiled based on location coordinates and are continuously monitored for segment status changes. The autonomous vehicle information 760 can include the AV information of the last known location of the AV 766 that is sent via a fleet operations interface (labeled as "(D)" in FIG. 7B) for back office processing 775 of AV fleet operations (labeled as "(B)" in FIG. 7B) of the compiled throughput data.

Figure 8:
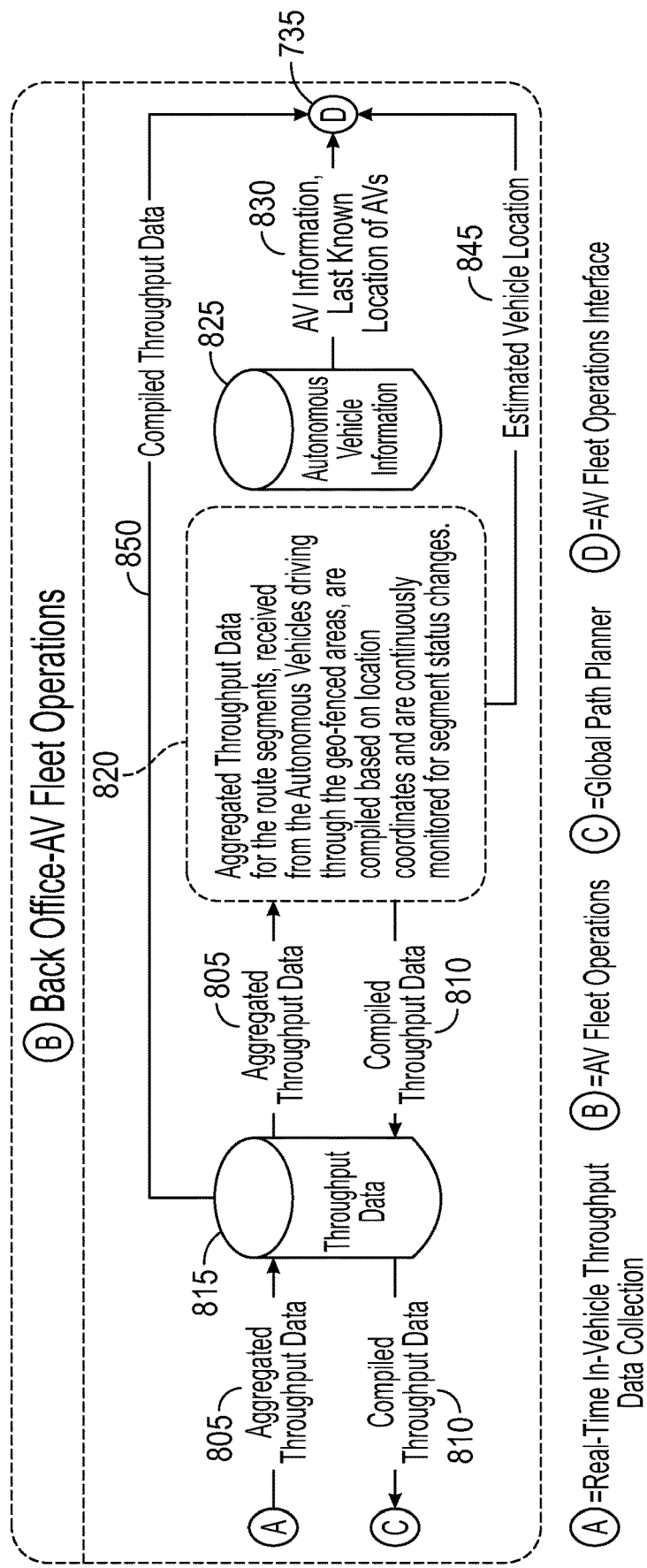
FIG. 8 illustrates an exemplary diagram of a back office of an AV fleet operation of the global path planning system in accordance with an embodiment.

FIG. 8 illustrates an exemplary diagram of a back office network of an AV fleet operation of the global path planning system in accordance with an embodiment. In FIG. 8, the throughput data 805 is composed of aggregated throughput data of real-time in-vehicle throughput data collection (label as "(A)" in FIG. 8) and generates compiled throughput data 810 for the global path planner (labeled as "(C)" in FIG. 8). Referring to FIG. 8, the throughput data 815 from real-time in-vehicle throughput data collection (label (A) in FIG. 8) is compiled throughput data 810 to be sent to the global path planner. The estimated vehicle location is calculated when an AV loses connectivity with the back office network based on the last reported data by the AV with its location coordinates and its current assigned AV route or path (See block 820 of FIG. 8). The autonomous vehicle information 825 is composed of AV information of the last known location of the AVs 830 which is sent to the AV fleet operations interface 735 (label "D" in FIG. 8) combined with the compiled throughput data 850 and the estimated vehicle location 845.

Figure 9:
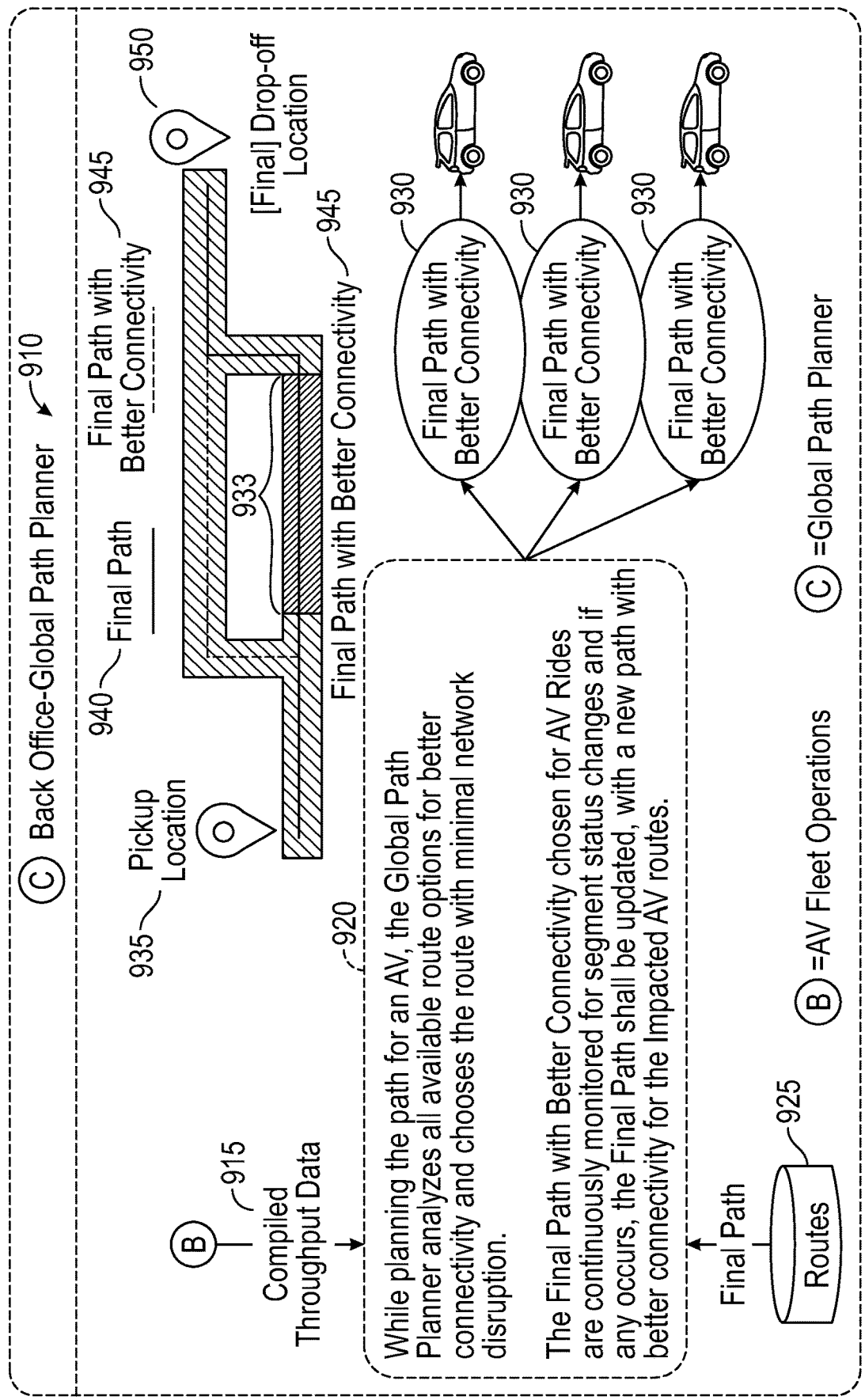
FIG. 9 illustrates an exemplary embodiment of the global path planner of the global path planning system in accordance with an embodiment.

FIG. 9 illustrates an exemplary diagram of the global path planner of the global path planning system in accordance with an embodiment. The Global Path Planner is responsible for planning the routes for AVs to drive around the geo-fenced AV operational area. It provides routes to Pick-up, Drop-off, Stand-by and Service Station locations. In addition to its current responsibilities, as part of this proposal, Global Path Planner shall consume the Compiled Throughput Data from AV Fleet Operations to plan for an additional route at the Final Drop-off Location of a shared AV ride, if the Final Drop-off Location falls under a Red or Yellow segment.

The inclusion of additional route to an Alternate Safe Location (i.e., Green segment) in the Final Path provided to the AV for a shared ride, enables the AV with the knowledge to drive to an area that is known for better connectivity, so the AV can communicate back to the back office network at the end of an assignment and get instructions from back office network for its next assignment. This approach shall radically reduce the number of stranded AVs at the final drop-off locations due to loss of connectivity with back office network for its next assignment. The global path planner can actively consume the compiled throughput data from the AV fleet operations and can actively update the final path with alternate safe location provided to AVs, if the status of the alternate safe location change based on the new data collected from other AVs in the area.

Referring to FIG. 9 the global path planner 910 executes the algorithm in a series of steps when notified by AV fleet operations (i.e. interface) on a change in throughput data for any route as follows: Step 1: When the global path planner 910 receives notification from AV fleet operations on a change in compiled throughput data 915 or when a request from an AV for a new path for AV reservation is received, determine all impacted AV routes 920 by correlating the location coordinates of the compiled throughput data with the final drop-off location (i.e. final drop-off location coordinates) 950; then at Step 2: for each impacted AV route, repeat the following steps: Step 2a: Determine alternate safe locations for the AV, closer to the final drop-off location 950, Step 2b: for each alternate safe location determined for an AV, query the throughput data table (not shown) to identify the closest location with acceptable (Green) throughput data, Step 2c: and update the final path with additional route to the identified alternate safe location and send the location data to the AV.

In FIG. 9, the global path planner 910 is executed by various algorithms at the back office (label "C" of FIG. 9). The compiled data 915 from the AV fleet operations (label "B" of FIG. 9) is implemented (block 920) while planning the path for the AV, the global path planner 910 analyzes all available route options (930) for better connectivity and chooses the route with minimal network disruption. The final path 940 with better connectivity 945 is chosen for AV rides and is continuously monitored from the pick up location 935 to the final drop off location 950 via path segments 933. Each path segment 933 is continuously monitored for segment status changes and if any occurs the final path shall be updated with a new path with better connectivity for the impacted AV routes.

Figure 10:
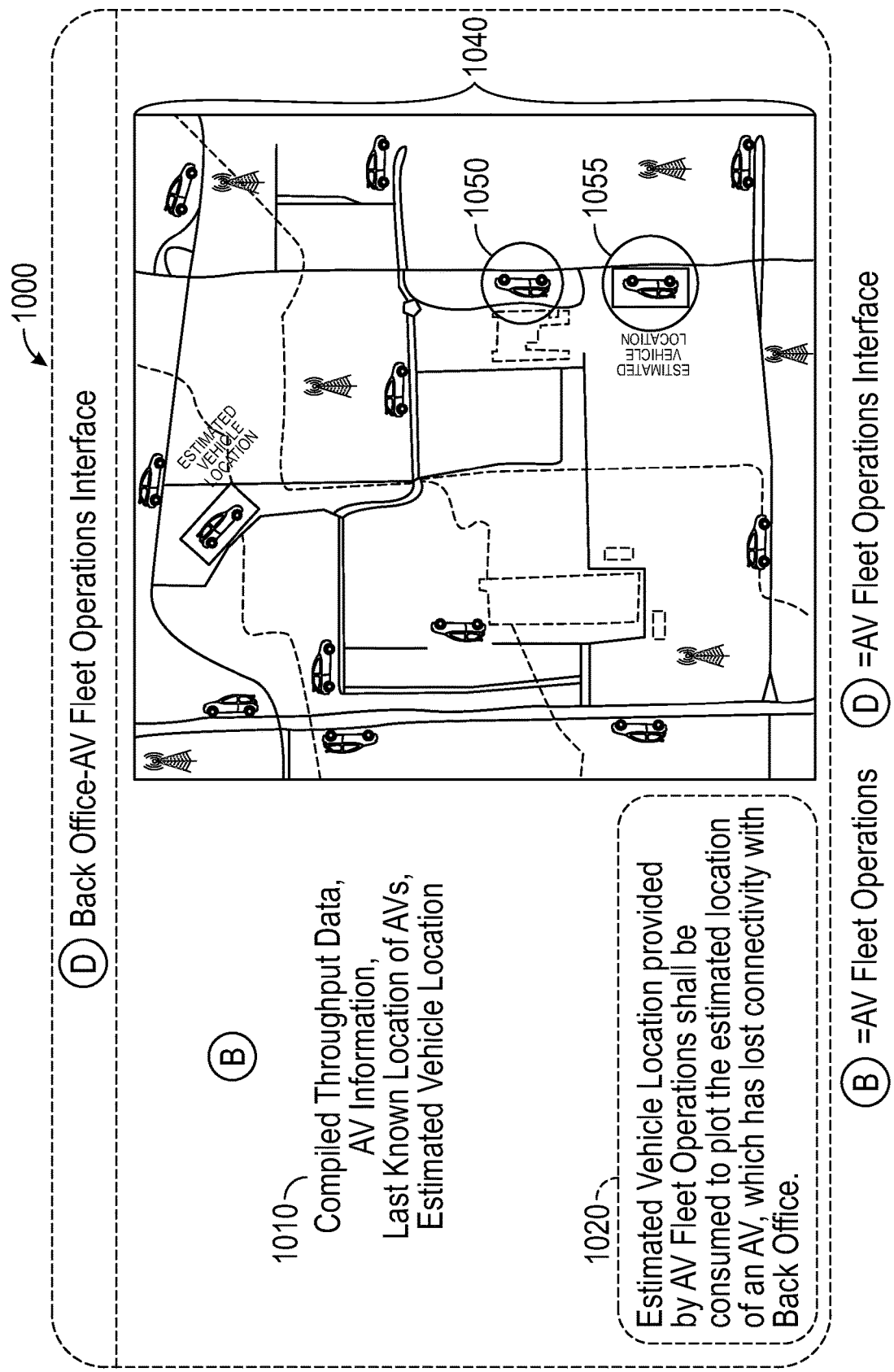
FIG. 10 illustrates an exemplary diagram of the back office AV fleet operations interface of the global path planning system in accordance with an embodiment.

FIG. 10 illustrates an exemplary diagram of the back office AV fleet operations interface of the global path planning system in accordance with an embodiment. The AV fleet operations has several user interfaces that serve as a medium for manual interactions with the fleet operations team in the back office network. The AV fleet operations interface shall consume the compiled throughput data to plot a multi-dimensional map view of the geo-fenced AV operational area, with route segments color coded (i.e., red, yellow or green) based on the throughput data for each segment and pin point the last known location of AVs that are part of the fleet.

In various exemplary embodiments, an upgraded interface provides the ability to AV fleet operations team to actively monitor the quality of cellular data connections in every route segment of the geo-fenced AV operational area, alter the AV routes by temporarily suspending or rerouting AV services in the affected areas and/or dispatch manual recovery teams to recover any stranded vehicles due to loss of connectivity with back office network.

In FIG. 10 the back office AV fleet operations interface 1000 (label "D" of FIG. 10) receives compiled throughput data, AV information, last known location of AVs, and estimate vehicle location (1010 of FIG. 10), which is configured in a mapping application presenting a map 1040 with AV estimated vehicle locations 1055 and last locations with connectivity of the vehicle 1050. In addition the estimate vehicle location 1020 is provided by AV fleet operations that are executed to plot the estimated location of the AV which has lost connectivity with the back office. The algorithm of the AV fleet operation interface 1000 receives compiled throughput data from AV fleet operations and repaints (i.e. re-configures) the impacted routes on the map. The compiled throughput data is outputted on the map 1040 which is a multi-dimensional map with AV route segments highlighted based on Throughput Data. When a change occurs in the compiled data, the AV fleet operations interface shall update the display map to reflect the state of the throughput data.

Hence, the AV fleet operations interface 1000 operates in two steps: Step 1: Upon receiving notification from AV fleet operations, determine all impacted AV routes segments in the map; and Step 2: Repaint each impacted AV route segment with the updated throughput data color as received from AV fleet operations.

Figure 11:
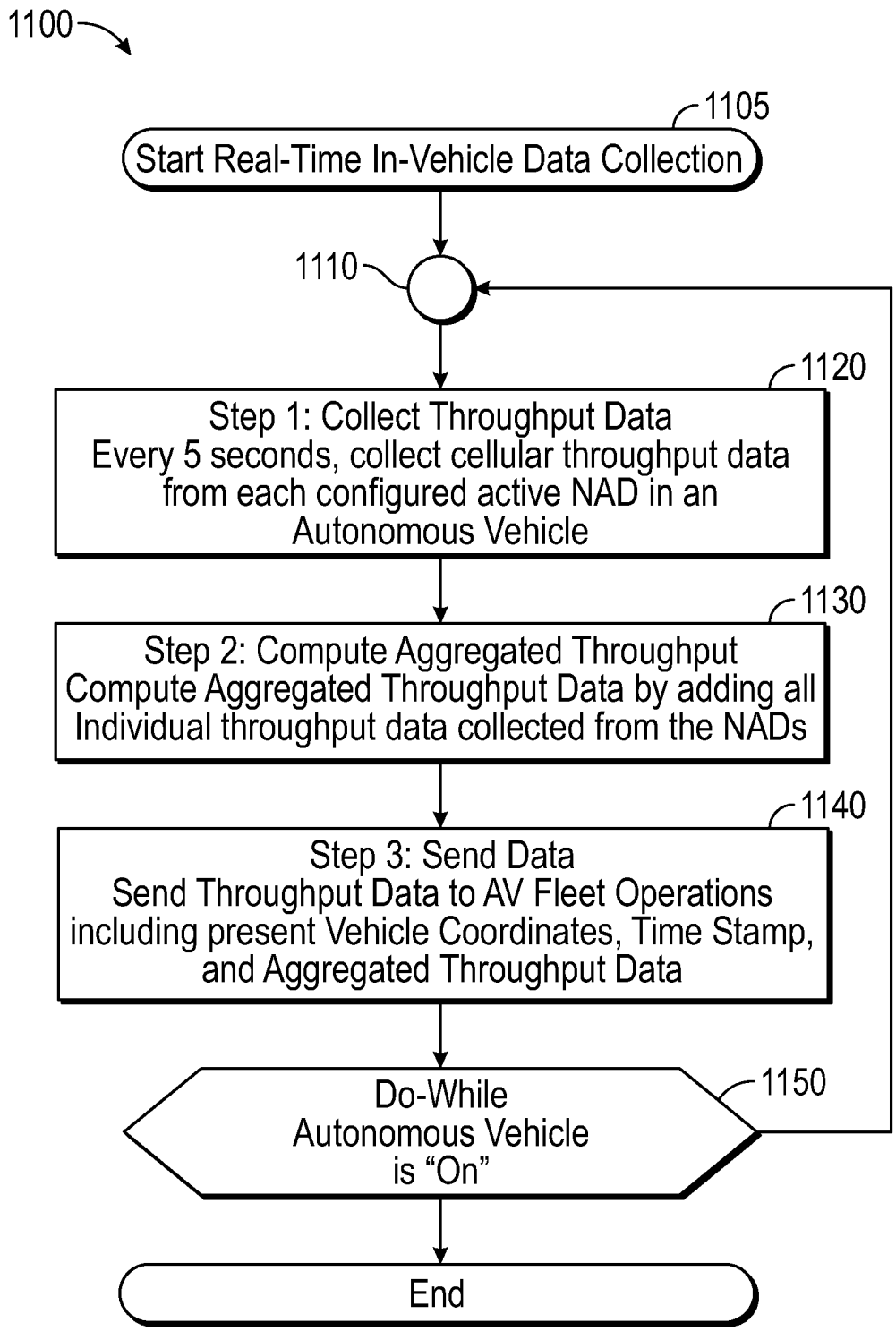
FIG. 11 illustrates an exemplary flow diagram of the implementation of the real-time in-vehicle cellular data throughput collection of the global path planning system in accordance with an embodiment.

FIG. 11 illustrates an exemplary flow diagram of the implementation of the real-time in-vehicle cellular data throughput collection of the global path planning system in accordance with an embodiment. In the flowchart 1100, initially at step 1105, real-time in-vehicle data collection of the cellular data throughput from each configured active NAD in an AV is collected to process and to send the processed data to AV fleet operations in the back office. The input of the throughput data from each network access device (NAD) results in an output of aggregated throughput data by processor in the vehicle. At step 1 (1120), of the flowchart 1100, the process collects the throughput data from every available active AV in the fleet to execute the following algorithm continuously: Step 1 (1120): Every 5 seconds, collect cellular throughput data from each configured active NAD in an AV; Step 2 (1130): Compute the aggregated throughput data by adding all individual throughput data from the NADs; and Step 3 (1140): Send computed the aggregated throughput data to AV fleet operations. The process is performed is performed during entire end to end operation of the AV (i.e. do-while AV is "ON" 1150).

Figure 12:
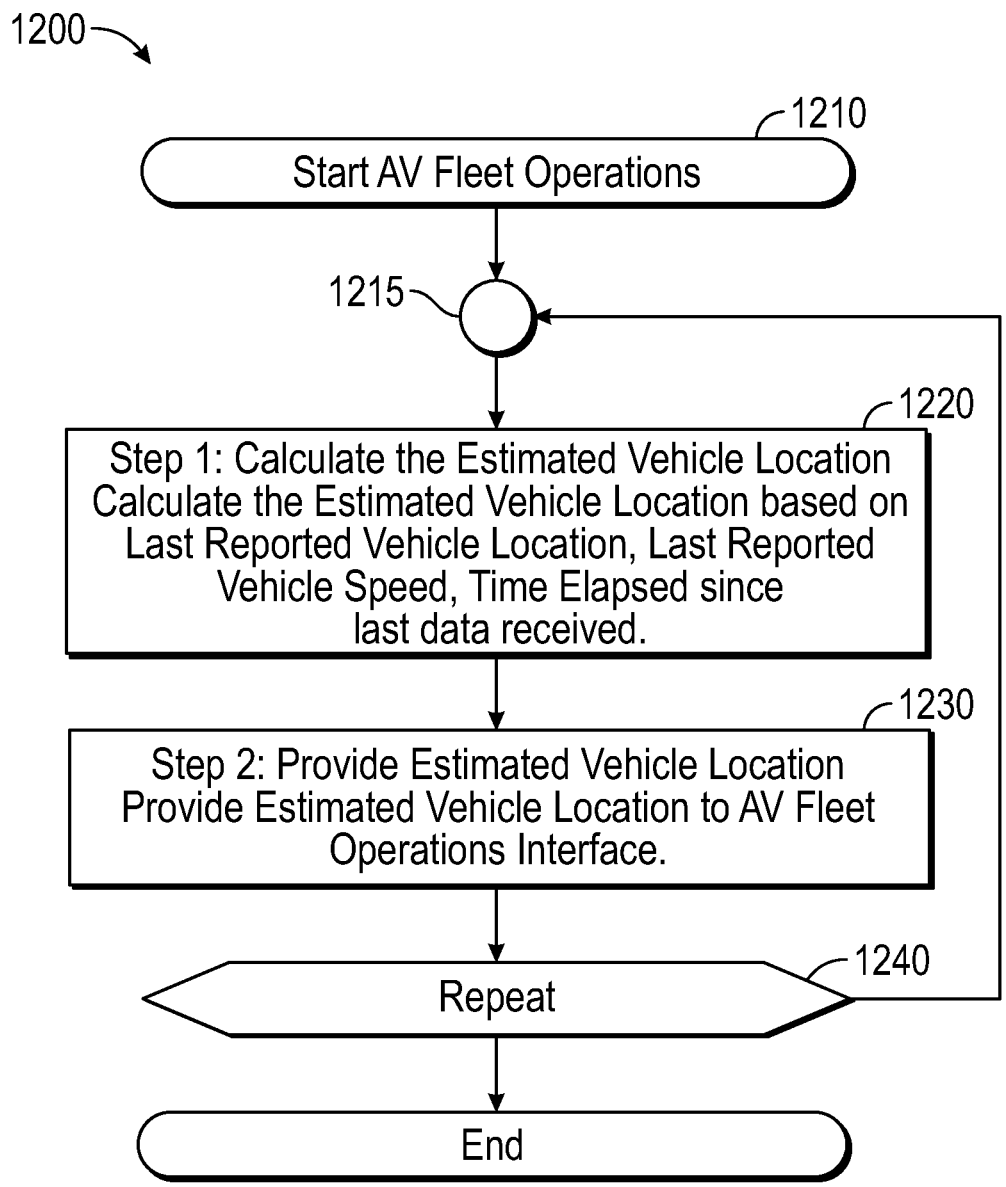
FIG. 12 illustrates an exemplary flowchart of the algorithm of the AV fleet operation of the global path planning system in accordance with an embodiment.

FIG. 12 illustrates an exemplary flowchart of the algorithm of the AV fleet operation of the global path planning system in accordance with an embodiment. The algorithm receives 1210 the estimated vehicle location from the AV fleet operations and redraws (or updates) the impacted (i.e. by the new location data) AV's location on the map. The input of the new location data is used to estimate the vehicle location for an output. A multi-dimensional map with AV's estimated vehicle location description may include an "ON" notification from AV fleet operations and the interface shall update the location of AVs that has incurred a lost connectivity from the back office, with the estimated vehicle location generated. In the flowchart 1200, the input is of the aggregated throughput data and the output is of the estimated vehicle location. In the flowchart 1200, the AV fleet operational steps are executed by the algorithm when a loss of connectivity is detected with an AV for a pre-defined amount of time. For instance, 30 seconds may be a default setting for a time period that is subject to change based on empirical results. At Step 1 (1220): the algorithm calculates the estimated vehicle location based on the following data: the last reported vehicle location, the last report vehicle speed, and the time that has elapsed since the last data received. At Step 2 (1230): the algorithm provides an estimated vehicle location to the AV fleet operations interface. The flow is repeated at 1240 via 1215 until the AV fleet operation is discontinued (i.e. stopped).

Figure 13:
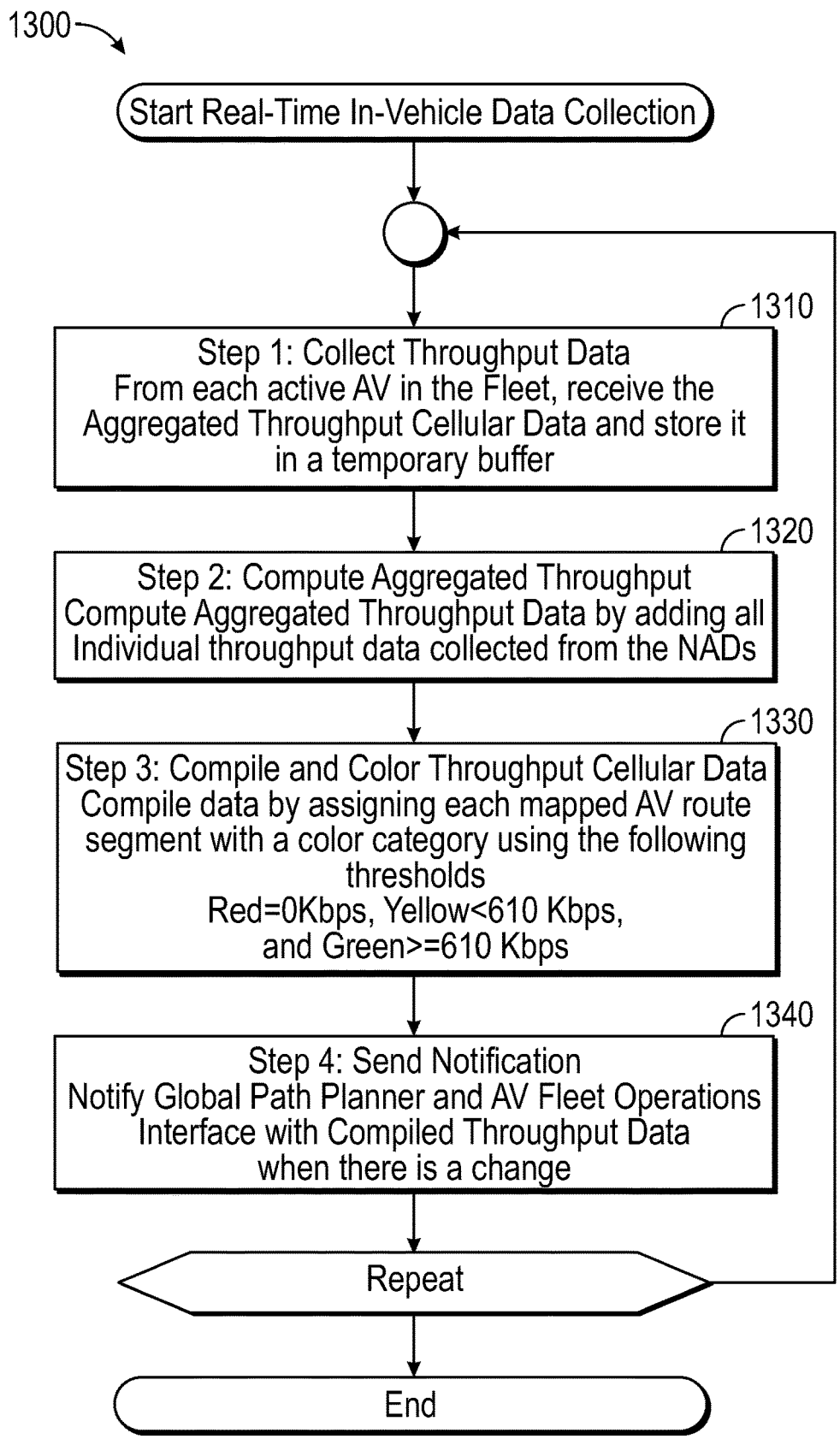
FIG. 13 illustrates an exemplary flowchart of an algorithm for AV fleet operations of the global path planning system in accordance with an embodiment.

FIG. 13, illustrates an exemplary flowchart of an algorithm for AV fleet operations of the global path planning system in accordance with an embodiment. In FIG. 13, the flowchart 1300, the algorithm receives the aggregated throughput data from each active AV in the fleet. In addition, the algorithm filters any duplicate or stale data and notifies the global path planner and AV fleet operations interface when there is a change that has occurred in the aggregated throughput data. The algorithm implemented in the flowchart 1300, receives inputs of the aggregated throughput data and outputs the compiled throughput data. The AV fleet operations implements the collecting, filtering and compiling operations by continuously executing the algorithm as follows: In step 1 (1310): From each active AV in the fleet, the algorithm receives the Aggregated Throughput Data and stores the data in a temporary buffer. Next, at step 2 (1320): the algorithm asynchronously updates a throughput data table by processing each new record from the temporary buffer and by eliminating any duplicate or outdated (i.e. stale) data for the same location coordinate. At step 3 (1330): the algorithm compiles the data and stores the compiled data in the throughput data table by assigning each mapped AV route segment with a throughput color category based on the following throughput thresholds: Red<5 Kbps, Yellow<600 Kbps, and Green>=to 600 Kbps. At step 4 (1340): when an opportunity arising in the processing flow, the algorithm can notify the global path planner and the AV fleet operations Interface about updates for the compiled throughput data.

Figure 14:
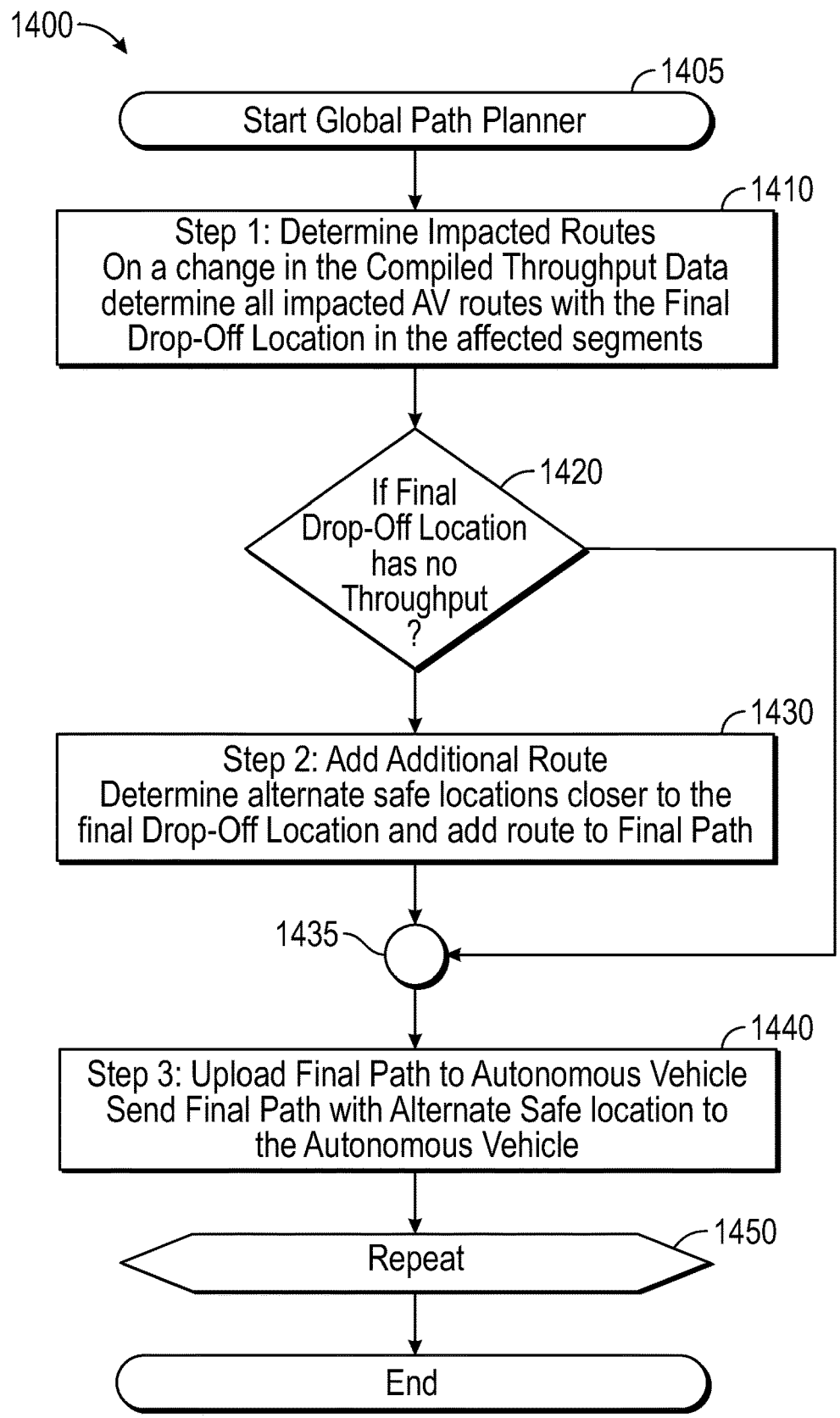
FIG. 14 illustrates an exemplary flowchart of an algorithm for the global path planner of the global path planning system in accordance with an embodiment.

FIG. 14 illustrates an exemplary flowchart of an algorithm for the global path planner of the global path planning system in accordance with an embodiment. The algorithm implemented in the flowchart 1400 receives compiled throughput data from the AV fleet operations and determines which routes need to be optimized, then sends the updated routes data to affected AVs. The algorithm illustrated in the flowchart 1400, receives as input, the compiled cellular data and outputs the final path with an alternate safe location. The algorithm is executed 1405 when the algorithm receives inputs of a notification from AV fleet operations indicating a change in compiled throughput data and a request from an AV for a new path from an AV reservation is received. At step 1 (1410), the algorithm determines the impacted routes by comparisons of the compiled throughput data to identify a change in the compiled throughput data and then determines which are the impacted AV routes with the final drop-off Location in the affected segments by the throughput data change. Next, at 1420 the algorithm makes a determination as to whether the final drop-off location has conditions that exhibit no throughput of data, or insufficient connectivity (i.e. limited throughput of data that negatively affects or severely affects the AV operation). If the response is non-affirmative (i.e. "no" and there is a sufficient throughput of data available), then the flow bypass step 2 and proceeds to 1435 to step 3 (1440). If the response is affirmative (i.e. "yes" and there is not a sufficient throughput of data) then the flow proceeds to step 2 (1430). At step 2 (1430), the algorithm determines an alternate safe location which is closer to the final drop-off Location and adds a new route to the route planning of the final path. Hence, an alternate safe location is only determined if there insufficient connectivity at the final location, else the algorithm proceeds directly to step 3 (1440). At step 3 (1440), the algorithm uploads the final path for the autonomous vehicle and sends the final path with alternate safe location to the autonomous vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for preventing at least one autonomous vehicle (AV) of a fleet of AVs in operation from a loss of throughput data connectivity based on processing of real-time aggregated throughput data received from one or more active AVs of the fleet of AVs communicating with a back office network wherein the back office network sends routing data to each available AV in the fleet of AVs, the method comprising:

collecting, by a processor of the back office network, an aggregate of the throughput data that comprises a set of measurements taken every few seconds by the processor of the back office network of at least a location of one or more active AVs communicating with the processor of the back office network for storing location-based throughput data measurements in a temporary buffer at the back office network to capture a view of a network throughput data performance comprising the throughput data of the location of one or more active AVs from a pickup location to a final drop-off location;

asynchronously updating, by the processor of the back office network, a set of records in a throughput data table corresponding to the location-based throughput data at a plurality of mapped AV routes for the one or more active AVs, by processing a throughput data table record in the temporary buffer of updated location-based throughput data to eliminate identified duplicate or out-of-date throughput data recorded in the throughput data table;

compiling, by the processor of the back office network, the throughput data of each record in the throughput data table and assigning each mapped AV route segment from the pickup location to the final drop-off location with a category of a throughput data threshold comprising a first, second and third throughput data threshold wherein a first throughput data threshold is less than 5 Kbps, the second throughput data threshold is less than 600 Kbps, and the third throughput data threshold is greater than or equal to 600 Kbps;

determining, by the processor of the back office network, at least one mapped AV route segment having an impact on the network throughput data performance based on a signal quality by mapping a set of signal quality strength changing properties observed by the processor of the back office network by coordinating the location-based throughput data to the mapped AV route segment and changes in the signal quality observed;

in response to a determination of the at least one mapped AV route segment having the impact to the network throughput data performance, categorizing, by the processor of back office network, the at least one mapped AV route segment by the processor in accordance with the first, second and third throughput data thresholds; and in response to the at least one mapped AV route segment categorized by the first throughput data threshold, changing, by the processor of the back office network, at least one or more AV route segments, or the final drop-off location of the mapped AV route segments to avoid the at least one mapped AV route segment categorized by the first throughput threshold to prevent the loss of throughput data connectivity between the AV and the processor of the back office network, and to enhance the network throughput data performance while the AV is traverses the one or more AV route segments or proceeds to the final drop-off location.

2. The method of claim 1, further comprising:

categorizing, by the processor of the back office network, one or more mapped AV route segments corresponding to a particular throughput data threshold by color for viewing available mapped AV route segments on a multi-dimensional map.

3. The method of claim 2, wherein the color corresponds to the throughput data threshold comprising: a red color for the throughput data threshold less than 5 Kbps, a yellow color for the throughput data threshold less than 600 Kbps, and a green color for the throughput data threshold greater than or equal to 600 Kbps.

4. The method of claim 2, further comprising:

receiving, by the processor of the back office network, a set of updated data of location, time, and the aggregate of the throughput data from the one or more AVs in communication with the processor of the back office network to change the one or more AV route segments for the AV to proceed from the pickup location to the drop-off location wherein the change of the one or more AV route segments attempts to maintain a higher level of throughput data connectivity.

5. The method of claim 1, further comprising:

receiving, by the processor of the back office network, a request by the AV to categorize the mapped AV route segments and the final drop-off location for each new AV reservation where the AV is proceeding from the pickup location to the final drop-off location.

6. The method of claim 1, further comprising:

instructing in advance of the AV proceeding to the final drop-off location, by a global path planner deployed with the processor of the back office network, if at the final drop-off location there is deemed the loss of throughput data connectivity to proceed to an alternative safe final drop-off location after having proceeded to the final drop-off location for a drop-off wherein at the alternative safe final drop-off location, the AV can maintain without loss the throughput data connectivity with the processor of the back office network.

7. The method of claim 6, further comprising:
adding an additional mapped route segment, by the global path planner, for a route of the AV to enable the AV to proceed to the alternative safe final location.

8. The method of claim 7, further comprising:
uploading, by the global path planner, the additional mapped route segment, to enable the AV to proceed to the alternative safe final location.

9. The method of claim 6, further comprising:
determining in advance, by the global path planner, of the AV proceeding to the final drop-off location, options of safe alternative final drop-off locations; and
presenting, by the global path planner, the safe alternative final drop-off locations to enable a choice of the safe alternative final drop-off location to maintain without loss the throughput data connectivity of the AV with the back office network.

10. The method of claim 1, further comprising:
continuously monitoring, by the back office network, the mapped AV route segments for compiled changes resulting in instances of loss of throughput data connectivity on mapped AV routes for the one or more active AVs.

11. A system for preventing a networked cloud-connected autonomous vehicle (AV) from losing connectivity with a back office network, the system comprising:
a processor of a back office network programmed to collect an aggregate of throughput data that comprises a set of measurements taken by the processor of the back office network of at least a location of one or more active AVs communicating with the processor of the back office network for storing location-based throughput data measurements in a temporary buffer at the back office network to capture a view of a network throughput data performance comprising throughput data of the one or more active AVs in a set of locations from a pickup location to a final drop-off location;
the processor of the back office network programmed to update a set of records in a throughput data table corresponding to the location-based throughput data at a plurality of mapped AV routes for the one or more active AVs, by processing a throughput data table record in the temporary buffer of updated location-based throughput data to eliminate identified duplicate or out-of-date throughput data recorded in the throughput data table;
the processor of the back office network programmed to compile the throughput data of each record in the throughput data table and assign each mapped AV route segment from the pickup location to the final drop-off location with a category of a set of throughput data thresholds comprising a first, a second, and a third throughput data threshold wherein a first throughput data threshold is less than 5 Kbps, the second throughput data threshold is less than 600 Kbps, and the third throughput data threshold is greater than or equal to 600 Kbps;
the processor of the back office network programmed to determine at least one mapped AV route segment that has an impact on the network throughput data performance based on a signal quality by a mapped set an effect by a compiled change in an AV reservation comprising a set of mapped AV route segments from a pick-up location to the final drop-off location;
in response to a determination of the at least one mapped AV route segment having an impact on the network throughput data performance, the processor of the back office network programmed to categorize the at least one mapped AV route segment in accordance with the first, second, and third throughput data thresholds; and
in response to the at least one mapped AV route segment categorized by the first throughput data threshold, the processor of the back office network programmed to change at least one or more AV route segments or the final drop-off location of the set of mapped AV route segments to avoid the at least one mapped AV route segment categorized by the first throughput threshold to prevent a loss of throughput data connectivity between the AV and the processor of the back office network, and to enhance the network throughput data performance while an AV traverses the one or more AV route segments or proceeds to the final drop-off location.

12. The system according to claim 11, further comprising:
the processor of the back office network is programmed to categorize one or more mapped AV route segments corresponding to a throughput data threshold by color for viewing available mapped AV route segments on a multi-dimensional map.

13. The system according to claim 12, wherein the color corresponds to the throughput data threshold comprising: a red color for the throughput data threshold approximately equal to 0 Kbps, a yellow color for the throughput data threshold less than 600 Kbps, and a green color for the throughput data threshold greater than or equal to 600 Kbps.

14. The system according to claim 11, further comprising:
the processor of the back office network programmed to receive a set of updated data of location, time, and an average aggregate of the throughput data from the one or more connected AVs in communication with the back office network to change the one or more AV route segments for the AV to proceed from the pickup location to the drop-off location wherein the change of the one or more AV route segments attempts to maintain a higher level of throughput data connectivity.

15. The system according to claim 11, further comprising:
the processor of the back office network is programmed to receive a request by the AV to assess the set of mapped AV route segments and final drop-off location for each received AV reservation where the AV is proceeding from the pickup location to the final drop-off location.

16. The system according to claim 11, further comprising:
a global path planner programmed with an algorithm and coupled with the processor of the back office network to instruct in advance of the AV proceeding to the final drop-off location, if at the final drop-off location there is deemed the loss of throughput data connectivity to proceed to an alternative safe final location after having proceeded to the final drop-off location for a drop-off wherein at the alternative safe final location, the AV is able to maintain without loss throughput data connectivity with the processor of the back office network.

17. The system according to claim 16, further comprising:
the global path planner determining in advance, of the AV proceeding to the final drop-off location, options of safe alternative final drop-off locations, and presenting the safe alternative final drop-off locations to enable a choice of the safe alternative final drop-off location to maintain without loss the throughput data connectivity of the AV with the back office network.

18. A system for real-time cellular data throughput data collection to prevent a loss of throughput data connectivity of an autonomous vehicle (AV) with a back office network, the system comprising:
- the back office network comprising a processor programmed with a set of instructions to execute an algorithm to collect an aggregate of throughput data that comprises a set of measurements taken of a location at which one or more active network devices (NADs) deployed in AVs which communicate with the processor of the back office network to store a set of location-based measurements in a temporary buffer at the back office network wherein the processor is programmed to monitor and to collect location-based throughput data sent from the NADs to an AV fleet operations interface at the back office network;
- the processor of the back office network programmed with the set of instructions to asynchronously update a set of records in a throughput data table corresponding to the location-based throughput data at a plurality of mapped AV routes for the one or more active NADs, by processing a throughput data table record in the temporary buffer of updated location-based throughput data to eliminate identified duplicate or out-of-date throughput data recorded in the throughput data table;
- the processor of the back office network programmed with the set of instructions to compile the throughput data of each record in the throughput data table and to assign each mapped AV route segment from the pickup location to a final drop location with a category of a set of throughput data thresholds comprising a first, second and third throughput data threshold wherein a first throughput data threshold is less than 5 Kbps, the second throughput data threshold is less than 600 Kbps, and the third throughput data threshold is greater than or equal to 600 Kbps;
- the processor of the back office network programmed with the set of instructions to determine at least one mapped AV route segment having an impact on network throughput data performance based on a signal quality by mapping a set of signal quality strength changing properties observed by the processor of the back office network by coordinating the location-based throughput data to the mapped AV route segment and changes in the signal quality observed;
- in response to a determination of the at least one mapped AV route segment having the impact of the network throughput data performance, the processor of back office network programmed with the set of instruction, to categorize the at least one mapped AV route segment in accordance with the first, second and third throughput data thresholds;
- in response to the at least one mapped AV route segment categorized by the first throughput data threshold, the processor of the back office network programmed with the set of instructions to change at least the one or more AV route segments or the final drop-off location of the set of mapped AV route segments while the AV traverses the one or more AV route segments or proceeds to the final drop-off location.

19. The system according to claim 18,
wherein the processor of the AV is programmed to receive route options for better throughput data connectivity in an attempt to prevent the loss of throughput data connectivity when proceeding from a pickup to a final drop-off location wherein the route options are based in part on the aggregate throughput data sent to the AV fleet operations interface processed by the processor of the back office network.

20. The system according to claim 19,
wherein the processor of the NAD is programmed to receive instructions in advance of the AV proceeding to the final drop-off location, via the AV fleet operations interface, if at the final drop-off location there is determined to be the loss of throughput data connectivity and is instructed to either proceed to an alternative safe final location after having gone to the final drop-off location for a drop-off or presented with a safe alternative final drop-off location.

* * * * *